(12) United States Patent
Iida et al.

(10) Patent No.: US 11,519,883 B2
(45) Date of Patent: Dec. 6, 2022

(54) STRUCTURE EVALUATION SYSTEM, STRUCTURE EVALUATION APPARATUS, AND STRUCTURE EVALUATION METHOD

(71) Applicant: KABUSHIKI KAISHA TOSHIBA, Tokyo (JP)

(72) Inventors: Sanae Iida, Kanagawa (JP); Takashi Usui, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 17/012,604

(22) Filed: Sep. 4, 2020

(65) Prior Publication Data

US 2021/0096110 A1 Apr. 1, 2021

Related U.S. Application Data

(63) Continuation of application No. PCT/JP2019/010887, filed on Mar. 15, 2019.

(51) Int. Cl.
*G01N 29/44* (2006.01)
*G01N 29/14* (2006.01)
(Continued)

(52) U.S. Cl.
CPC ...... *G01N 29/4463* (2013.01); *G01M 5/0008* (2013.01); *G01M 5/0066* (2013.01); *G01M 7/025* (2013.01); *G01N 29/14* (2013.01); *G01N 29/4454* (2013.01); *G01N 29/4472* (2013.01); *G01N 2291/011* (2013.01); *G01N 2291/0289* (2013.01)

(58) Field of Classification Search
CPC ............... G01N 29/4463; G01N 29/14; G01N 29/4454; G01N 29/4472; G01N 2291/011; G01N 2291/0289; G01M 7/025; G01M 5/0066
USPC ........................................................ 702/34, 39
See application file for complete search history.

(56) References Cited

U.S. PATENT DOCUMENTS 5,642,328 A * 6/1997 Houck .................. G01V 1/306
367/53
6,099,471 A * 8/2000 Torp ........................ A61B 8/08
600/438
(Continued)

FOREIGN PATENT DOCUMENTS

CN 108459083 A 8/2018
EP 3 321 673 A1 5/2018
(Continued)

*Primary Examiner* — Lisa M Caputo
*Assistant Examiner* — Rose M Miller
(74) *Attorney, Agent, or Firm* — Finnegan, Henderson, Farabow, Garrett & Dunner, LLP

(57) ABSTRACT

According to one embodiment, a structure evaluation system of the embodiments includes a plurality of sensors, an arrival time determiner, a reliability calculator, and a map generator. The plurality of sensors detect elastic waves. The arrival time determiner determines arrival times of the elastic waves using elastic waves detected by the plurality of respective sensors. The reliability calculator calculates reliabilities related to measurement waveforms of the elastic waves on the basis of the arrival times. The map generator generates a first map on the basis of the calculated reliabilities or the reliabilities and a distance.

10 Claims, 23 Drawing Sheets

(51) Int. Cl.
*G01M 7/02* (2006.01)
*G01M 5/00* (2006.01)

(56) References Cited

U.S. PATENT DOCUMENTS

| | | | | |
|---|---|---|---|---|
| 11,170,519 | B2* | 11/2021 | Ebata | A61B 8/5207 |
| 2012/0010776 | A1* | 1/2012 | Paturle | B60C 11/13 |
| | | | | 701/31.5 |
| 2015/0257731 | A1* | 9/2015 | Abe | A61B 8/5207 |
| | | | | 600/443 |
| 2017/0086795 | A1* | 3/2017 | Kanayama | A61B 8/5207 |
| 2018/0074019 | A1 | 3/2018 | Iida et al. | |
| 2018/0074023 | A1 | 3/2018 | Iida et al. | |

FOREIGN PATENT DOCUMENTS

| | | |
|---|---|---|
| JP | 2004-219075 A | 8/2004 |
| JP | 2014-095555 A | 5/2014 |
| JP | 2018-165732 A | 10/2018 |
| JP | 2018-171513 A | 11/2018 |
| WO | WO 2018/051534 A1 | 9/2018 |

* cited by examiner

STRUCTURE EVALUATION SYSTEM, STRUCTURE EVALUATION APPARATUS, AND STRUCTURE EVALUATION METHOD

CROSS-REFERENCE TO RELATED APPLICATION

This is a Continuation Application of International Application PCT/JP2019/010887, filed on Mar. 15, 2019, and the entire contents of all of which are incorporated herein by reference.

FIELD

Embodiments described herein relate generally to a structure evaluation system, a structure evaluation apparatus, and a structure evaluation method.

BACKGROUND

Recently, problems due to deterioration of structures such as bridges constructed during the period of high economic growth have become manifest. In the unlikely event that an accident occurs in such a structure, the damage thereto is immeasurable. Therefore, in the related art, technologies for monitoring the state of a structure have been proposed. For example, a technology for detecting damage to a structure using an acoustic emission (AE) method in which elastic waves generated due to occurrence of internal cracks or progress of internal cracks are detected by a highly sensitive sensor has been proposed. The AE is elastic waves generated due to progress of fatigue cracks in materials. In the AE method, elastic waves are detected as AE signals (voltage signals) by an AE sensor utilizing a piezoelectric element. AE signals are detected as a sign before fracture of materials occurs. Therefore, generation frequencies and signal intensities of AE signals are useful as indexes indicating the soundness of materials. For this reason, research is being conducted on a technology for detecting signs of deterioration in a structure using the AE method.

Incidentally, a tomography method is known as a method of evaluating a structure utilizing AE signals. Tomography is one of inverse analysis techniques for estimating an internal velocity field structure in a measurement area utilizing an arrival time difference between signals detected by a plurality of sensors. Tomography can utilize a non-destructive examination method in which a damaged part inside a structure is detected as a change in velocity field. Particularly, a method of using AE signals generated from the inside of a material as signal sources thereof is known for AE tomography. However, results obtained through AE tomography in an actual environment include an estimated error based on a measurement error, and thus they are not always correct. For this reason, there are cases in which the accuracy of evaluating a deterioration state of a structure based on the results obtained through AE tomography is low.

DETAILED DESCRIPTION

The present invention provides a problem to be solved by the present invention is to provide a structure evaluation system, a structure evaluation apparatus, and a structure evaluation method, in which the accuracy of evaluating a deterioration state of a structure can be improved.

According to one embodiment, a structure evaluation system of embodiments includes a plurality of sensors, an arrival time determiner, a reliability calculator, and a map generator. The plurality of sensors detect elastic waves. The arrival time determiner determines arrival times of the elastic waves using elastic waves detected by the plurality of respective sensors. The reliability calculator calculates reliabilities related to measurement waveforms of the elastic waves on the basis of the arrival times. The map generator generates a first map on the basis of the calculated reliabilities or the reliabilities and a distance.

Hereinafter, a structure evaluation system, a structure evaluation apparatus, and a structure evaluation method of embodiments will be described with reference to the drawings.

First Embodiment

Figure 1:
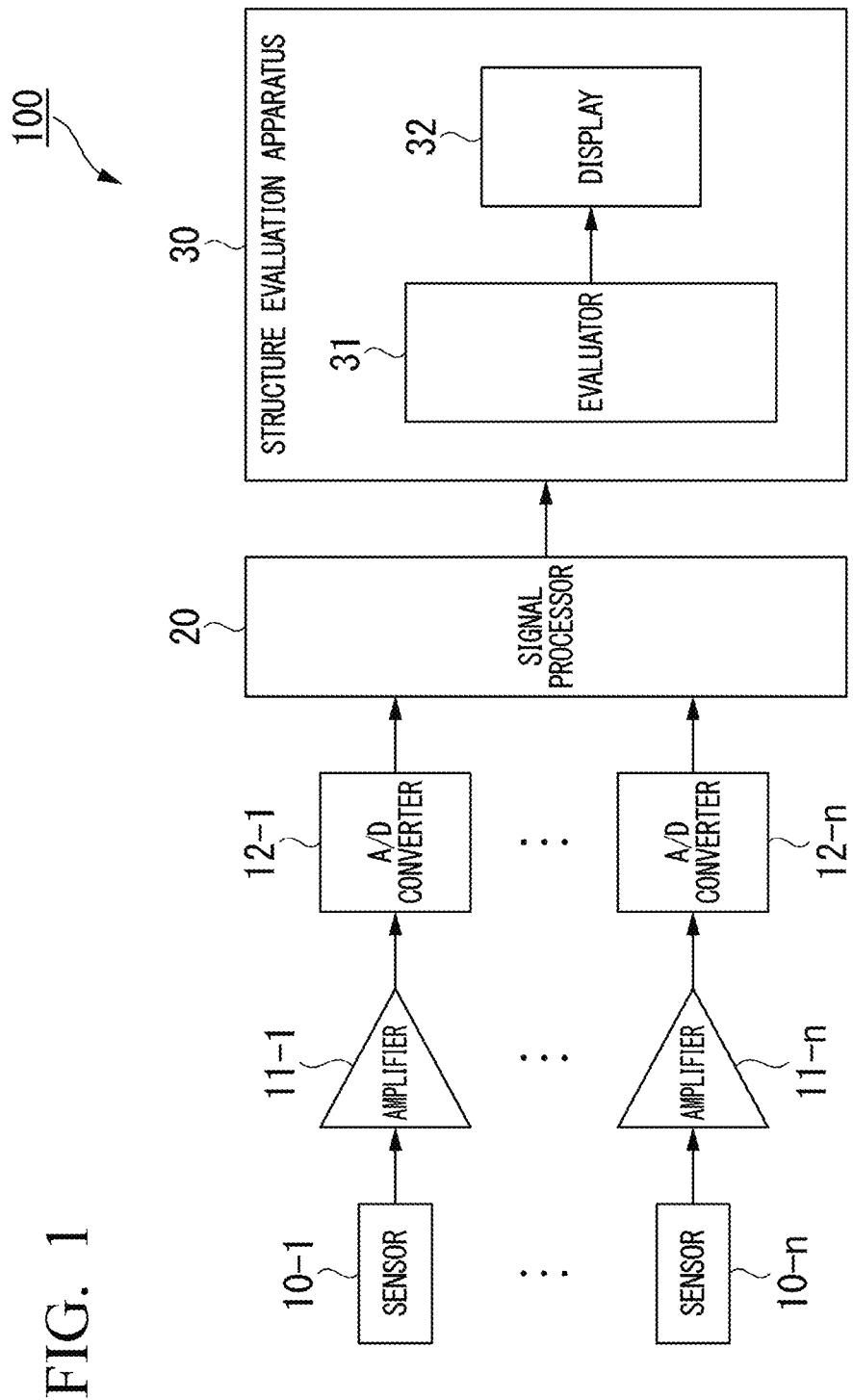
FIG. 1 is a view showing a configuration of a structure evaluation system according to a first embodiment.

FIG. 1 is a view showing a configuration of a structure evaluation system 100 according to a first embodiment.

The structure evaluation system 100 is used for evaluating soundness of a structure. In the following description, evaluation denotes that a degree of the soundness of a structure, that is, a deterioration state of a structure is determined on the basis of a certain standard. In the following description, a bridge constituted of concrete will be described as an example of a structure, but a structure is not necessarily limited to a bridge. Regarding a structure, any structure may be adopted as long as elastic waves are generated due to occurrence or progress of cracks or an external impact (for example, rain or artificial rain). For example, a structure may be bedrock. A bridge is not limited to a structure built on a river, a valley, or the like and includes various structures (for example, a viaduct on an expressway) provided above the ground.

In addition, damage that affects an evaluation of the deterioration state of a structure includes, for example, damage inside a structure which interferes with transmission of elastic waves such as cracks, void, and, deteriorated and liquefied concrete. Here, cracks include vertical cracks, horizontal cracks, diagonal cracks, and the like. Vertical cracks are cracks that are generated in a direction perpendicular to the surface of a structure on which sensors are installed. Horizontal cracks are cracks that are generated in a horizontal direction with respect to the surface of a structure on which sensors are installed. Diagonal cracks are cracks that are generated in directions other than the horizontal and vertical directions with respect to the surface of a structure on which sensors are installed. Deteriorated and liquefied concrete having a state of mixture of sands and gravels is caused by deterioration at boundary between asphalt and a concrete slab.

Hereinafter, a specific configuration of the structure evaluation system 100 will be described.

The structure evaluation system 100 includes a plurality of sensors 10-1 to 10-$n$ (n is an integer of 3 or larger), a plurality of amplifiers 11-1 to 11-$n$, a plurality of A/D converters 12-1 to 12-$n$, a signal processor 20, and a structure evaluation apparatus 30. The signal processor 20 and the structure evaluation apparatus 30 are connected to each other by a wire such that communication can be performed. In the following description, when the sensors 10-1 to 10-$n$ are not distinguished from each other, each of the sensors will be described as a sensor 10. In the following description, when the amplifiers 11-1 to 11-$n$ are not distinguished from each other, each of the amplifiers will be described as an amplifier 11. In the following description, when the A/D converters 12-1 to 12-$n$ are not distinguished from each other, each of the A/D converters will be described as an A/D converter 12.

The sensor 10 is installed in a structure. For example, the sensor 10 is installed in a concrete slab of a bridge. The sensor 10 includes a piezoelectric element and detects elastic waves generated from the inside of a structure. The sensor 10 is installed at a position where elastic waves can be detected. For example, the sensor 10 is installed on any surface of a structure, such as a front surface, a side surface, and a bottom surface. The sensor 10 converts detected elastic waves into AE source signals which are voltage signals. The sensor 10 outputs the AE source signals to the amplifier 11.

For example, a piezoelectric element having a sensitivity within a range of 10 kHz to 1 MHz is used in the sensor 10. Regarding the kind of the sensor 10, there are a resonance type having a resonant peak within a frequency range, a broadband type in which resonance is curbed, and the like. However, any kind of the sensor 10 may be adopted. In addition, regarding a method in which the sensor 10 detects elastic waves, there are a voltage output type, a resistance change type, an electrostatic capacitance type, and the like. However, any detection method may be adopted. An acceleration sensor may be used in place of the sensor 10. In this case, the acceleration sensor detects elastic waves generated from the inside of a structure. Further, the acceleration sensor converts the detected elastic waves into AE source signals which are voltage signals by performing processing similar to that of the sensor 10. Thereafter, the acceleration sensor outputs the converted AE source signals to the amplifier 11. The thickness of a structure is 15 cm or thicker, for example.

The amplifier 11 amplifies AE source signals output from the sensor 10 and outputs the amplified AE source signals to the A/D converter 12.

When amplified AE source signals are received, the A/D converter 12 quantizes the AE source signals and converts the AE source signals into digital signals. The A/D converter 12 outputs the AE source signals as digital time series data to the signal processor 20.

Time series data output from the A/D converter 12 is input to the signal processor 20. The signal processor 20 performs signal processing for digital signals of the input time series data. For example, signal processing performed by the signal processor 20 includes noise removal, parameter extraction, and the like. The signal processor 20 generates transmission data including digital signals subjected to signal processing and outputs the generated transmission data to the structure evaluation apparatus 30.

The structure evaluation apparatus 30 includes a central processing unit (CPU), a memory, an auxiliary storage device, and the like connected to each other through a bus and executes an evaluation program. When the evaluation program is executed, the structure evaluation apparatus 30 functions as an apparatus including an evaluator 31 and a display 32. All or some of the functions of the structure evaluation apparatus 30 may be realized using hardware such as an application specific integrated circuit (ASIC), a programmable logic device (PLD), or a field programmable gate array (FPGA). In addition, the evaluation program may be recorded in a computer readable recording medium. For example, a computer readable recording medium is a portable medium such as a flexible disk, a magneto-optic disc, a ROM, or a CD-ROM; or a storage device such as a hard disk built into a computer system. In addition, the evaluation program may be transmitted and received via an electric communication line.

Transmission data output from the signal processor 20 is input to the evaluator 31. The evaluator 31 evaluates the soundness of a structure on the basis of the input transmission data.

The display 32 is an image display device such as a liquid crystal display, an organic electroluminescence (EL) display, or the like. The display 32 displays an evaluation result in accordance with control of the evaluator 31. The display 32 may be an interface for connecting an image display device to the structure evaluation apparatus 30. In this case, the display 32 generates video signals for displaying an evaluation result and outputs the video signals to the image display device connected to itself.

Figure 2:
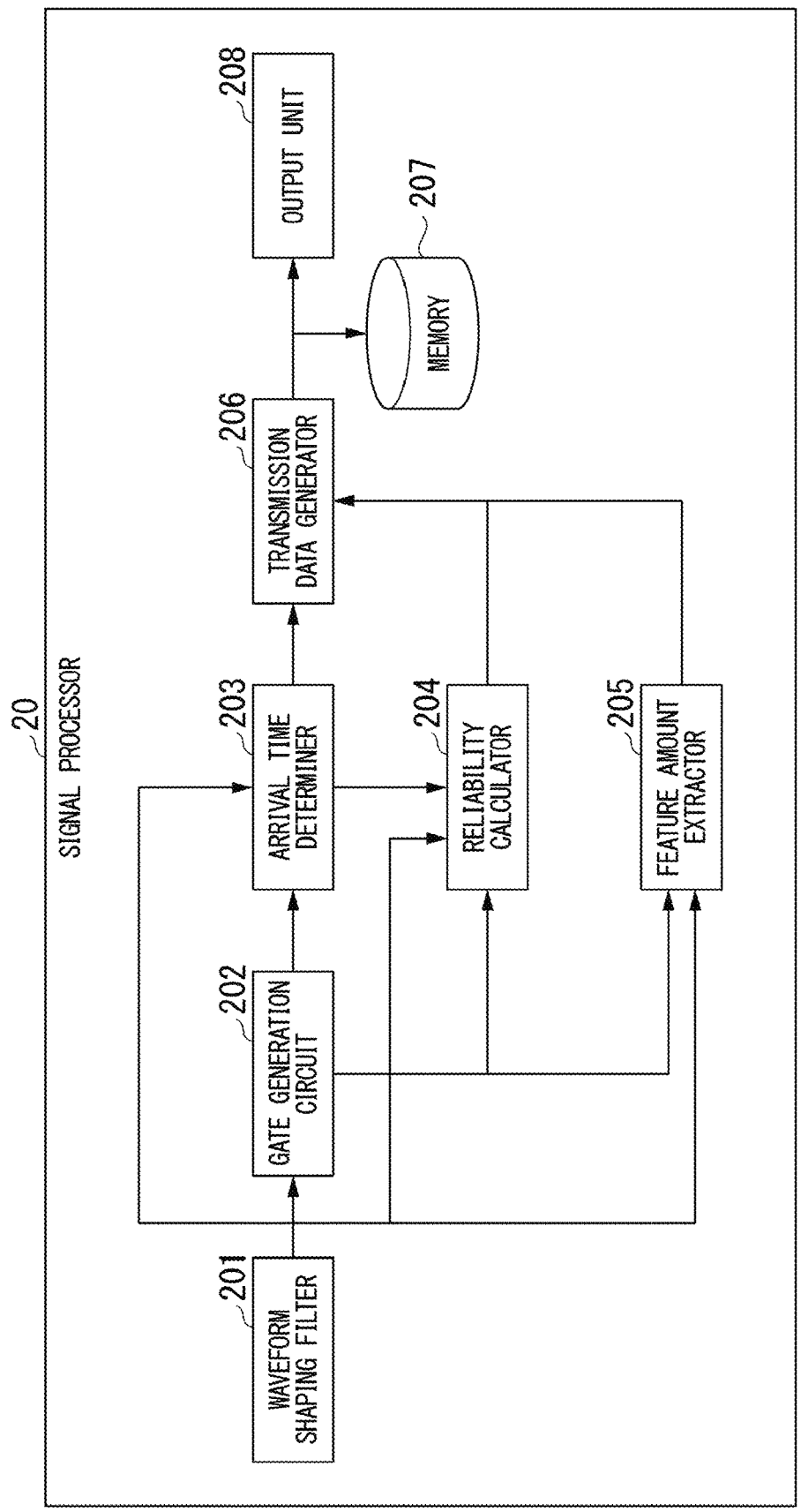
FIG. 2 is a schematic block diagram showing a function of a signal processor according to the first embodiment.

FIG. 2 is a schematic block diagram showing a function of the signal processor 20 according to the first embodiment.

The signal processor 20 includes a waveform shaping filter 201, a gate generation circuit 202, an arrival time determiner 203, a reliability calculator 204, a feature amount extractor 205, a transmission data generator 206, a memory 207, and an output unit 208.

The waveform shaping filter 201 removes noise components beyond a predetermined signal band from digital signals of input time series data. For example, the waveform shaping filter 201 is a digital band-pass filter (BPF). The waveform shaping filter 201 outputs signals after noise components are removed (which will hereinafter be referred to as "noise-removed elastic wave signals") to the gate generation circuit 202, the arrival time determiner 203, the reliability calculator 204, and the feature amount extractor 205.

The noise-removed elastic wave signals output from the waveform shaping filter 201 are input to the gate generation circuit 202. The gate generation circuit 202 generates a gate signal indicating whether or not a waveform of an input noise-removed elastic wave signal is continuous. For example, the gate generation circuit 202 is realized with an envelope detector and a comparator. The envelope detector detects an envelope of a noise-removed elastic wave signal. For example, an envelope is extracted by squaring a noise-removed elastic wave signal and performing predetermined processing (for example, processing using a low-pass filter, or Hilbert transformation) for the squared output value. The comparator judges whether or not the envelope of a noise-removed elastic wave signal is equal to or larger than a predetermined threshold.

When the envelope of a noise-removed elastic wave signal becomes equal to or larger than the predetermined threshold, the gate generation circuit 202 outputs a first gate signal indicating that the waveform of the noise-removed elastic wave signal is continuous to the arrival time determiner 203, the reliability calculator 204, and the feature amount extractor 205. Meanwhile, when the envelope of a noise-removed elastic wave signal becomes smaller than the predetermined threshold, the gate generation circuit 202 outputs a second gate signal indicating that the waveform of the noise-removed elastic wave signal is not continuous to the arrival time determiner 203, the reliability calculator 204, and the feature amount extractor 205.

Noise-removed elastic wave signals output from the waveform shaping filter 201 and gate signals output from the gate generation circuit 202 are input to the arrival time determiner 203. The arrival time determiner 203 determines a first elastic wave arrival time $t_M$ and a second elastic wave arrival time $t_{TH}$ using a noise-removed elastic wave signal which has been input while the first gate signal is input. The first elastic wave arrival time $t_M$ and the second elastic wave arrival time $t_{TH}$ are any of an arrival time of an elastic wave obtained through machine learning, a time at which an amplitude of a noise-removed elastic wave signal exceeds the predetermined threshold, and a time at which a predetermined standard in which these pieces of information are combined is satisfied.

An arrival time of an elastic wave obtained through machine learning is a time at which it is judged that the sensor 10 receives an elastic wave through machine learning. Regarding a method of obtaining the first elastic wave arrival time $t_M$ through machine learning, for example, a technique such as an Akaike's information criterion (AIC), ChangeFinder, or a change point detection algorithm from deep learning can be used. In the following description, a case in which ChangeFinder is used as a technique of obtaining the first elastic wave arrival time $t_M$ and a time at which an amplitude of a noise-removed elastic wave signal exceeds the predetermined threshold is used as a technique of obtaining the second elastic wave arrival time $t_{TH}$ will be described. The arrival time determiner 203 outputs the determined first elastic wave arrival time $t_M$ and the determined second elastic wave arrival time $t_{TH}$ as time information to the reliability calculator 204 and the transmission data generator 206.

Noise-removed elastic wave signals, gate signals, and time information are input to the reliability calculator 204. The reliability calculator 204 calculates a reliability related to a measurement waveform of an elastic wave on the basis of the time information obtained while the first gate signal is input. The reliability is a value related to a reciprocal of a difference $\Delta t=|t_M-t_{TH}|$ between the first elastic wave arrival time $t_M$ and the second elastic wave arrival time $t_{TH}$. The reliability calculator 204 outputs information of the calculated reliability to the transmission data generator 206.

Noise-removed elastic wave signals output from the waveform shaping filter 201 and gate signals output from the gate generation circuit 202 are input to the feature amount extractor 205. The feature amount extractor 205 extracts feature amounts of a noise-removed elastic wave signal using a noise-removed elastic wave signal which has been input while the first gate signal is input. Feature amounts are information indicating features of a noise-removed elastic wave signal.

For example, feature amounts include an amplitude [mV] of a waveform of a noise-removed elastic wave signal, a rising time [usec] of a gate signal, a duration [usec] of a gate signal, a zero-crossing count number [times] of a noise-removed elastic wave signal, an energy [arb.] of a waveform of a noise-removed elastic wave signal, a frequency [Hz] of a noise-removed elastic wave signal, and the like. The feature amount extractor 205 outputs parameters related to extracted feature amounts to the transmission data generator 206. When parameters related to feature amounts are output, the feature amount extractor 205 causes a sensor ID to be associated with the parameters related to the feature amounts. A sensor ID indicates identification information for identifying the sensor 10 installed in an area which becomes a target of evaluating the soundness of a structure (which will hereinafter be referred to as "an evaluation area").

For example, an amplitude of a noise-removed elastic wave signal is a value of the maximum amplitude in a noise-removed elastic wave signal. For example, a rising time of a gate signal is a time T1 at which a gate signal rises from the value of zero beyond a predetermined value set in advance. For example, a duration of a gate signal is a time at which an amplitude becomes smaller than a value set in advance from the start of rising of a gate signal. For example, a zero-crossing count number of a noise-removed elastic wave signal is the number of times a noise-removed elastic wave signal crosses a reference line passing through the value of zero. For example, an energy of a waveform of a noise-removed elastic wave signal is a value obtained by performing time integration of a squared amplitude at each point of time. The definition of the energy is not limited to that in the foregoing example and may be approximating using an envelope curve of a waveform, for example. A frequency of a noise-removed elastic wave signal is a frequency of a noise-removed elastic wave signal.

Time information, information of reliability, and parameters related to feature amounts are input to the transmission data generator 206. The transmission data generator 206 generates transmission data by causing the time information, the information of reliability, and the parameters related to feature amounts which have been input to be associated with each other.

The memory 207 stores transmission data. For example, the memory 207 is a dual port random access memory (RAM).

The output unit 208 successively outputs transmission data stored in the memory 207 to the structure evaluation apparatus 30.

Figure 3:
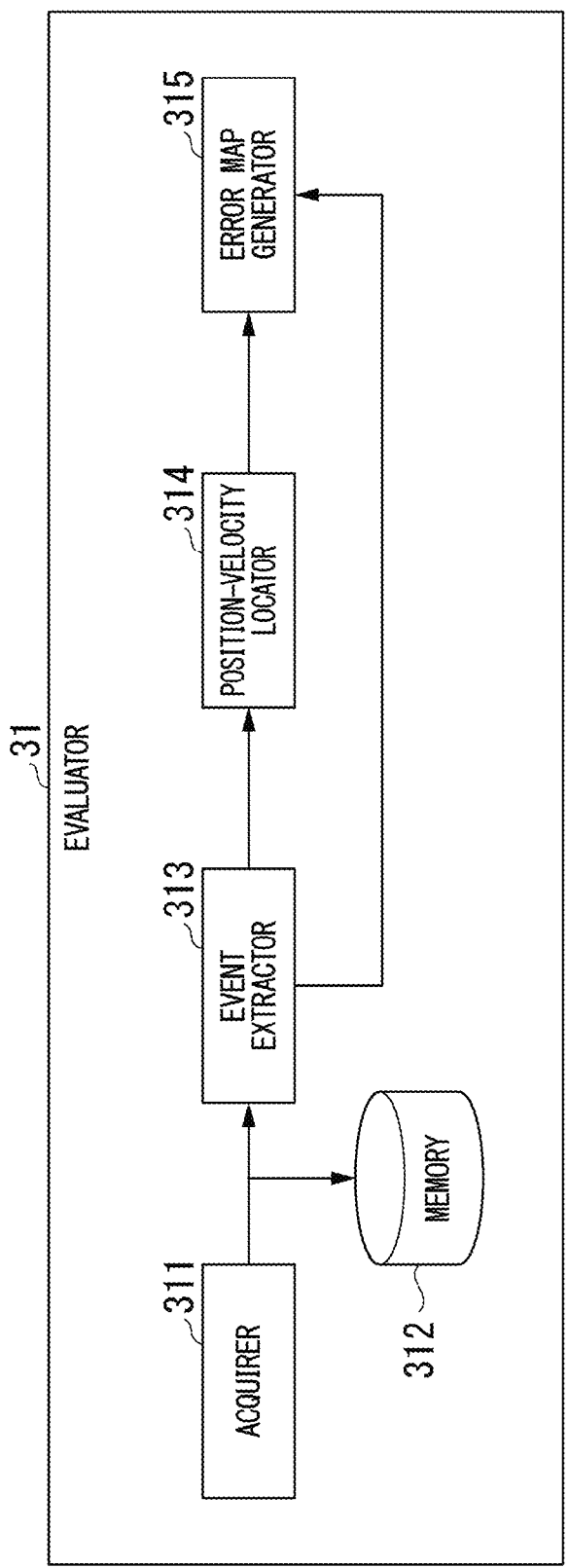
FIG. 3 is a schematic block diagram showing a function of an evaluator according to the first embodiment.

FIG. 3 is a schematic block diagram showing a function of the evaluator 31 according to the first embodiment. As shown in FIG. 3, the evaluator 31 includes an acquirer 311, a memory 312, an event extractor 313, a position-velocity locator 314, and an error map generator 315.

The acquirer 311 acquires transmission data output from the signal processor 20. The acquirer 311 stores the acquired transmission data in the memory 312.

The memory 312 stores the transmission data acquired by the acquirer 311. The memory 312 is constituted using a storage device such as a magnetic hard disk device or a semiconductor storage device.

The event extractor 313 extracts transmission data of one event from the transmission data stored in the memory 312. An event indicates a certain event of generation of elastic waves which have occurred in a structure. When an event occurs once due to occurrence of cracks or the like in a structure, elastic waves are detected by a plurality of sensors 10 substantially at the same time. That is, transmission data related to elastic waves detected substantially at the same time is stored in the memory 312. Here, the event extractor 313 provides a predetermined time window and extracts, as transmission data of one event, all the transmission data of which the arrival time is present within a range of the time window. The event extractor 313 outputs the extracted transmission data of one event to the position-velocity locator 314 and the error map generator 315. A range Tw of a time window may be determined to become a range of Tw≥dmax/v using an elastic wave propagation velocity v of a target structure and a maximum sensor interval dmax. Since it is desirable that the range Tw be set with as small values as possible in order to avoid erroneous detection, Tw=dmax/v can be adopted practically.

The position-velocity locator 314 locates the position of a generation source of an elastic wave (which will hereinafter be referred to as "an elastic wave source") and an elastic wave propagation velocity of a structure on the basis of a plurality of pieces of transmission data extracted by the event extractor 313.

Information related to an installation position (which will hereinafter be referred to as "sensor position information") of the sensor 10 installed in the structure is associated with a sensor ID and is located by the position-velocity locator 314 in advance. For example, the sensor position information includes latitude and longitude, distances in the horizontal direction and the perpendicular direction from a reference position of a structure, or the like. A Kalman filter, a least squares method, or the like may be used for locating the positions of the elastic wave source and the elastic wave propagation velocities of a structure. The position-velocity locator 314 outputs the located positional information of the elastic wave source to the error map generator 315.

The error map generator 315 generates an error map (first map) on the basis of the information of the reliability and the time information included in transmission data of a plurality of events output from the event extractor 313 and the located positions of the elastic wave source. The error map indicates a distribution diagram in which the evaluation area is divided into a plurality of sections and an integrated value of a value related to the reciprocal of the time difference between the arrival times of elastic waves is allocated to each of the sections. That is, the error map is a distribution diagram in which the degree of the size of the time difference (error) between the arrival times of elastic waves is indicated in the evaluation area. In the error map, when there is a difference between the sections regarding a passing frequency of an elastic wave, a section having a high passing frequency has a large integrated value of the reliability, and a section having a low passing frequency has a small integrated value of the reliability. Various kinds of regularization least squares methods such as a Kalman filter and a least squares method can be used for generating an error map. In virtue of the error map, it is possible to ascertain the area in the evaluation area having a large degree of the time difference between the arrival times of elastic waves or the magnitude of the passing frequency of an elastic wave in each of the sections. When the degree of the tune difference between the arrival times of elastic waves increases, there is a higher possibility of occurrence of a defect such as poor adhesion of the sensor 10.

Figure 4:
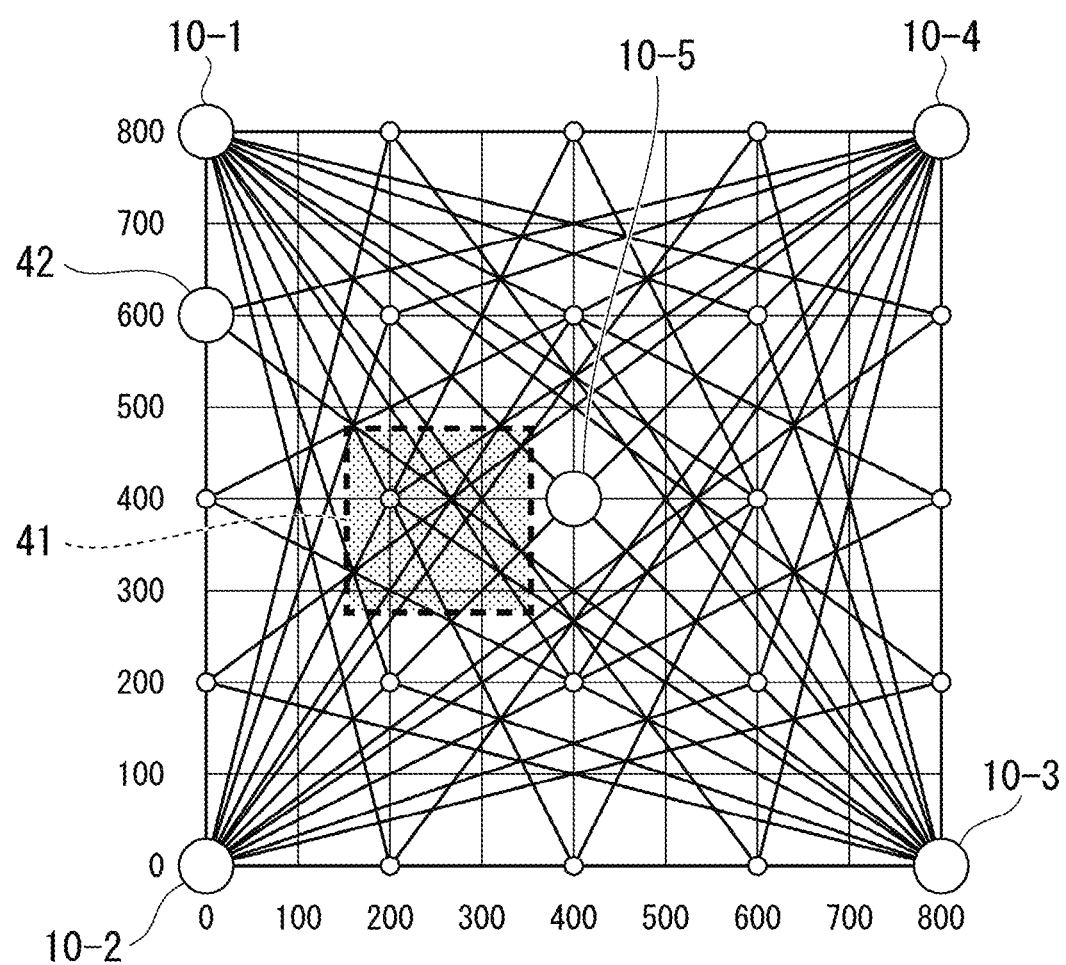
FIG. 4 is a view showing a structure model of a concrete floor slab prepared for a simulation.

Next, using FIGS. 4 to 6, processing of the structure evaluation system 100 according to the present embodiment will be described. FIG. 4 is a view showing a structure model of a concrete floor slab prepared for a simulation. The concrete floor slab shown in FIG. 4 has a square shape of which one side is 800 mm. The sensors 10-1 to 10-4 are installed at four corners of the concrete floor slab and the sensor 10-5 is installed at the center of the concrete floor slab. In addition, in FIG. 4, an area 41 indicates an area in which damage has occurred (which will hereinafter be referred to as "a damage area"). In addition, as an example of a simulation, elastic waves are generated by applying 25 impacts to the concrete floor slab.

Figure 5A:
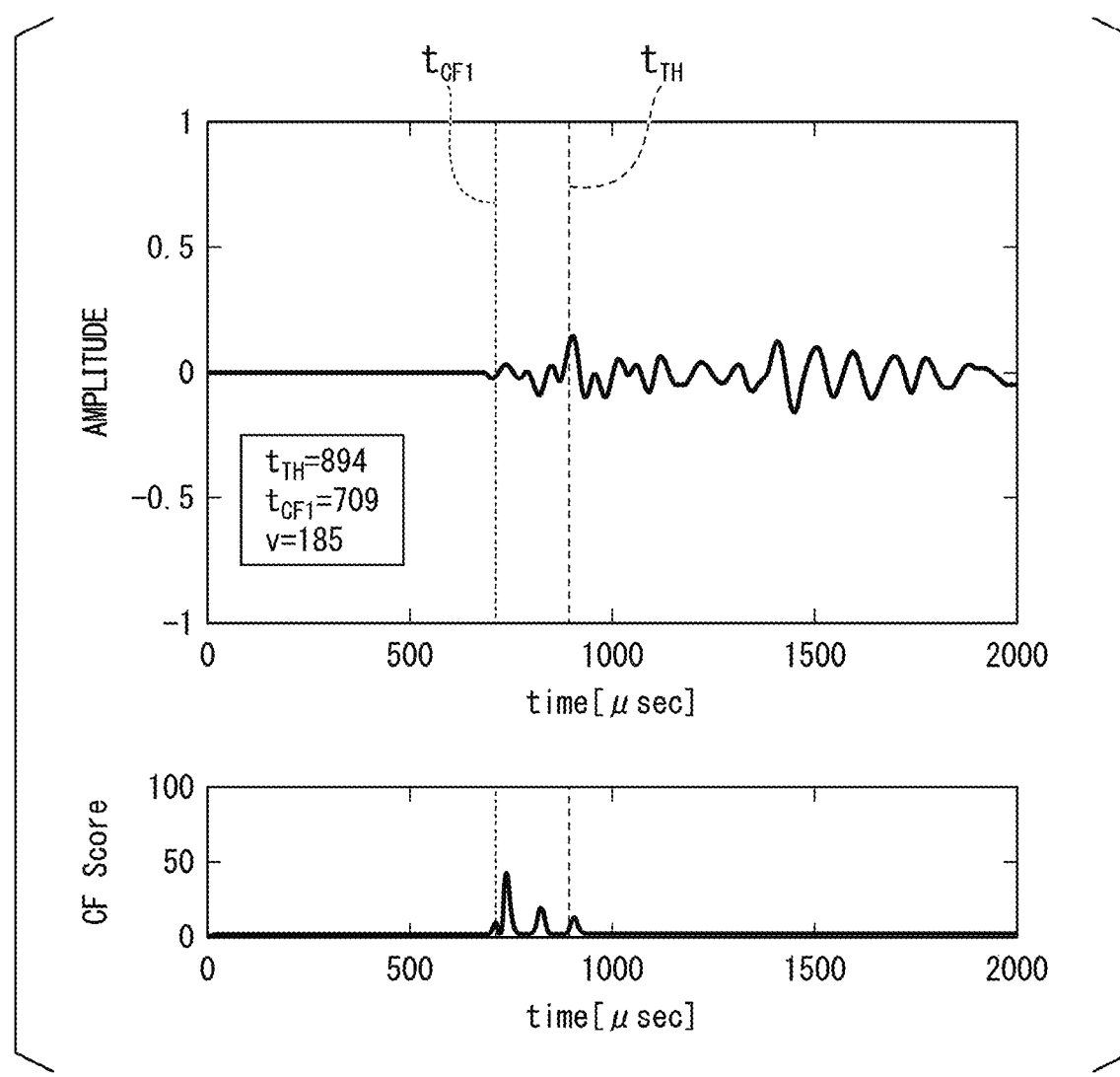
FIG. 5A is a view showing a waveform of an elastic wave detected by a sensor.
Figure 5B:
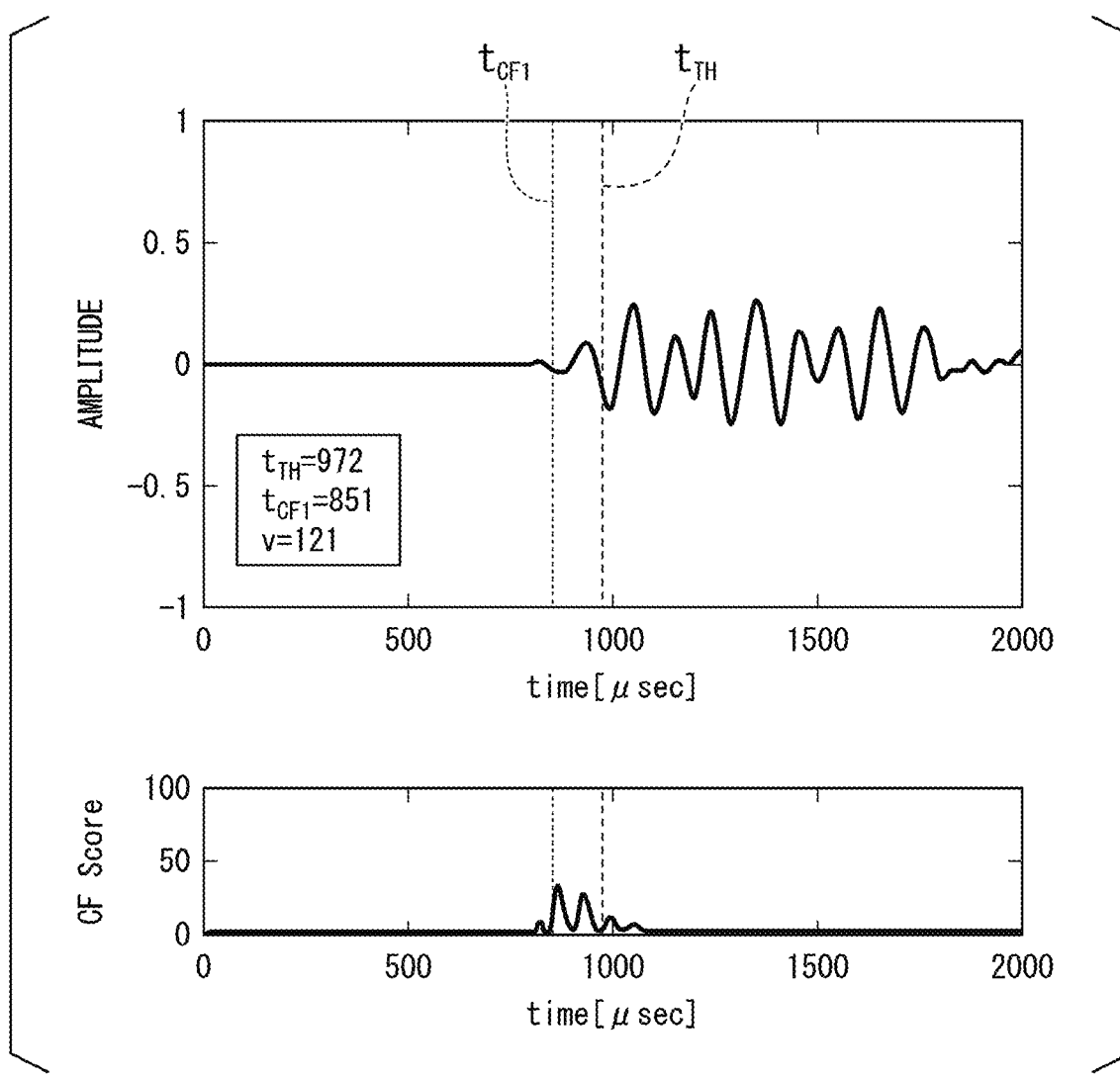
FIG. 5B is a view showing a waveform of an elastic wave detected by the sensor.
Figure 5C:
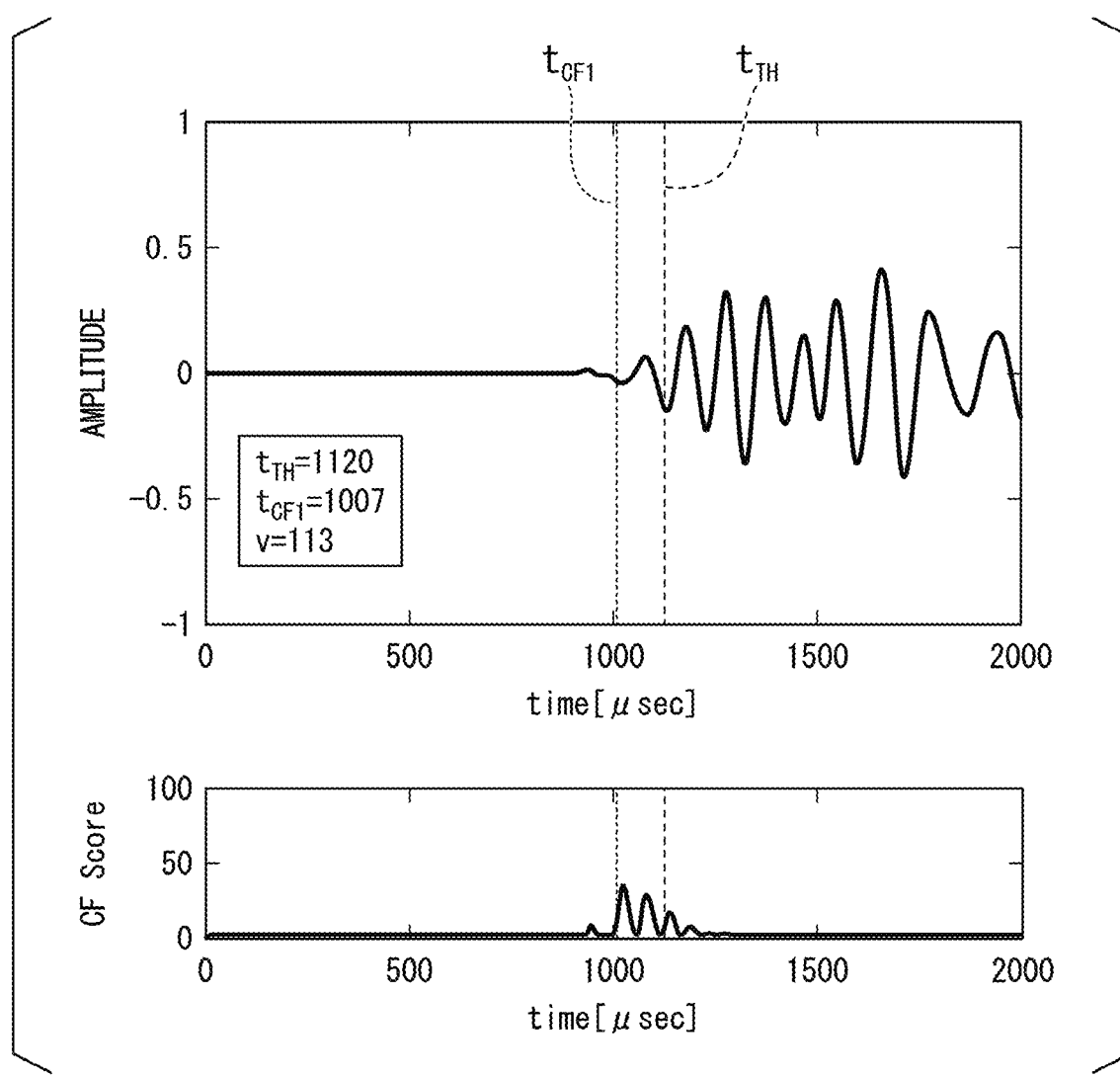
FIG. 5C is a view showing a waveform of an elastic wave detected by the sensor.
Figure 5D:
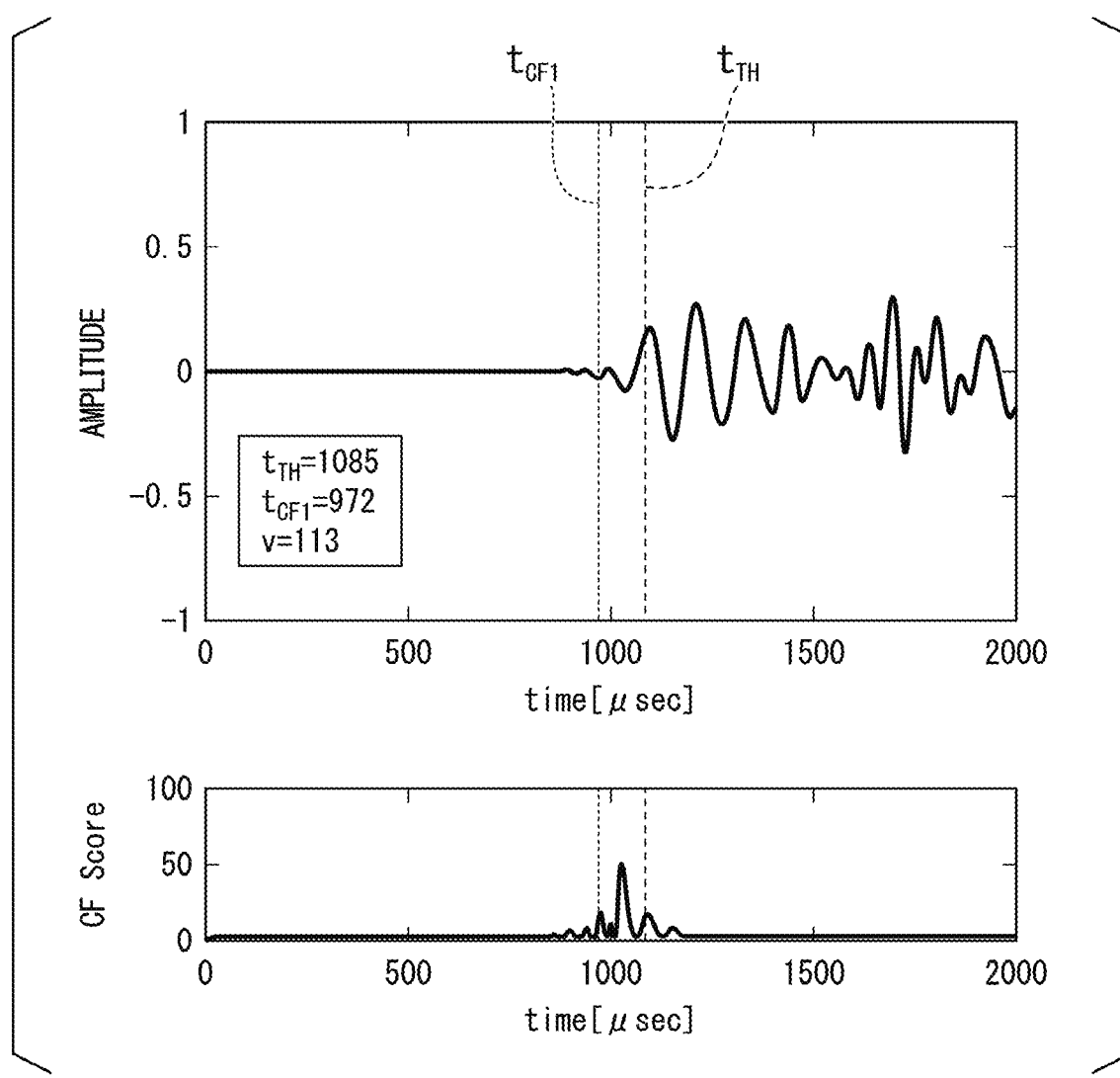
FIG. 5D is a view showing a waveform of an elastic wave detected by the sensor.
Figure 5E:
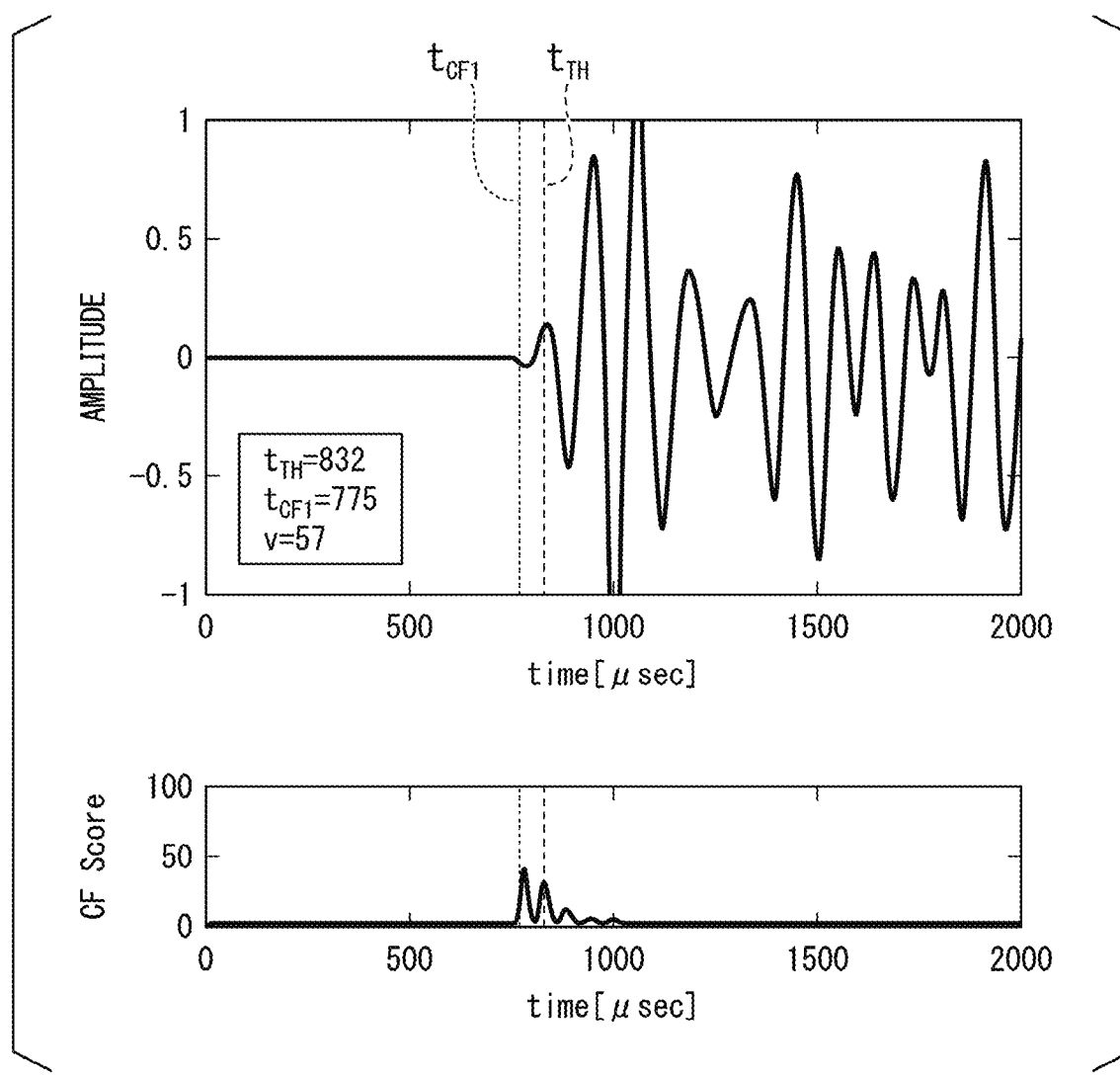
FIG. 5E is a view showing a waveform of an elastic wave detected by the sensor.

When an impact is applied to the concrete floor slab at a position indicated by the point 42 in FIG. 4, FIGS. 5A to 5E show the waveforms of elastic waves detected by the respective sensors 10-1 to 10-5. FIG. 5A shows the waveform of an elastic wave detected by the sensor 10-1, FIG. 5B shows the waveform of an elastic wave detected by the sensor 10-2, FIG. 5C shows the waveform of an elastic wave detected by the sensor 10-3, FIG. 5D shows the waveform of an elastic wave detected by the sensor 10-4, and FIG. 5E shows the waveform of an elastic wave detected by the sensor 10-5. In the upper diagrams in FIGS. 5A to 5E, the vertical axis indicates an amplitude of an elastic wave, and the horizontal axis indicates a time. In addition, in the lower diagrams in FIGS. 5A to 5E, the vertical axis indicates a score of a change finder (CF), and the horizontal axis indicates a time. In FIGS. 5A to 5E, a time $t_{CF1}$ is the first elastic wave arrival time $t_M$ obtained by the arrival time determiner 203 using the technique of ChangeFinder. That is, the time $t_{CF1}$ is a time at which the score of the CF exceeds a certain threshold. In FIGS. 5A to 5E, a time $t_{TH}$ is the second elastic wave arrival time $t_{TH}$.

In FIGS. 5A and 5B, it is ascertained that the error between the first elastic wave arrival time $t_M$ and the second elastic wave arrival time $t_{TH}$ is significant. As a cause thereof, it is assumed that the amplitude of the measurement waveform is small (signal-to-noise (SN) is poor) and the time at which the amplitude of the elastic wave exceeds the threshold is detected in a delayed manner. It is ascertained, when the sensor 10-1 and the sensor 10-2 are checked afterward, that there is a problem of poor adhesion.

Figure 6:
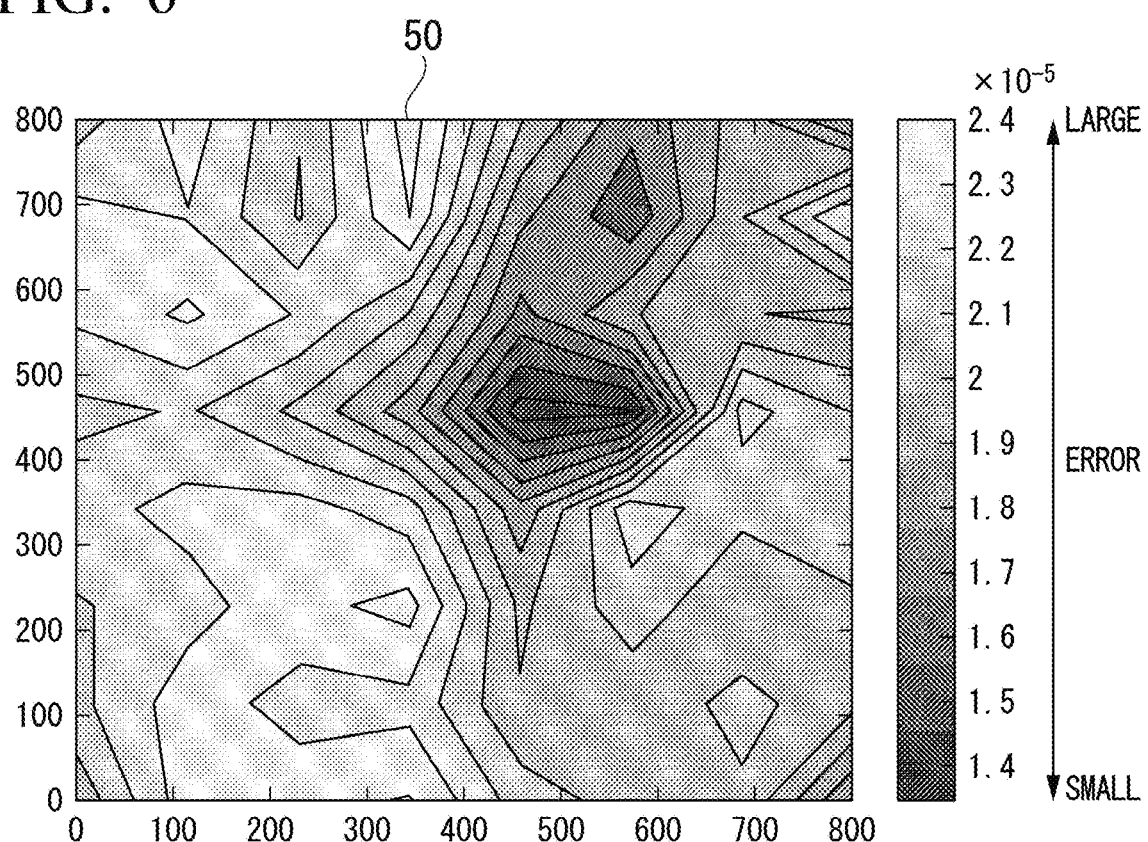
FIG. 6 is a view showing a specific example of an error map according to the present embodiment.

FIG. 6 is a view showing a specific example of an error map according to the present embodiment.

FIG. 6 shows a contour diagram of an error map 50 when elastic waves are generated by applying 25 impacts to the concrete floor slab in the foregoing simulation. As shown in FIG. 6, there is a significant error in an area on the left side in the error map 50. As a cause thereof, it is assumed that there is poor adhesion in the sensor 10-1 and the sensor 10-2.

Figure 7:
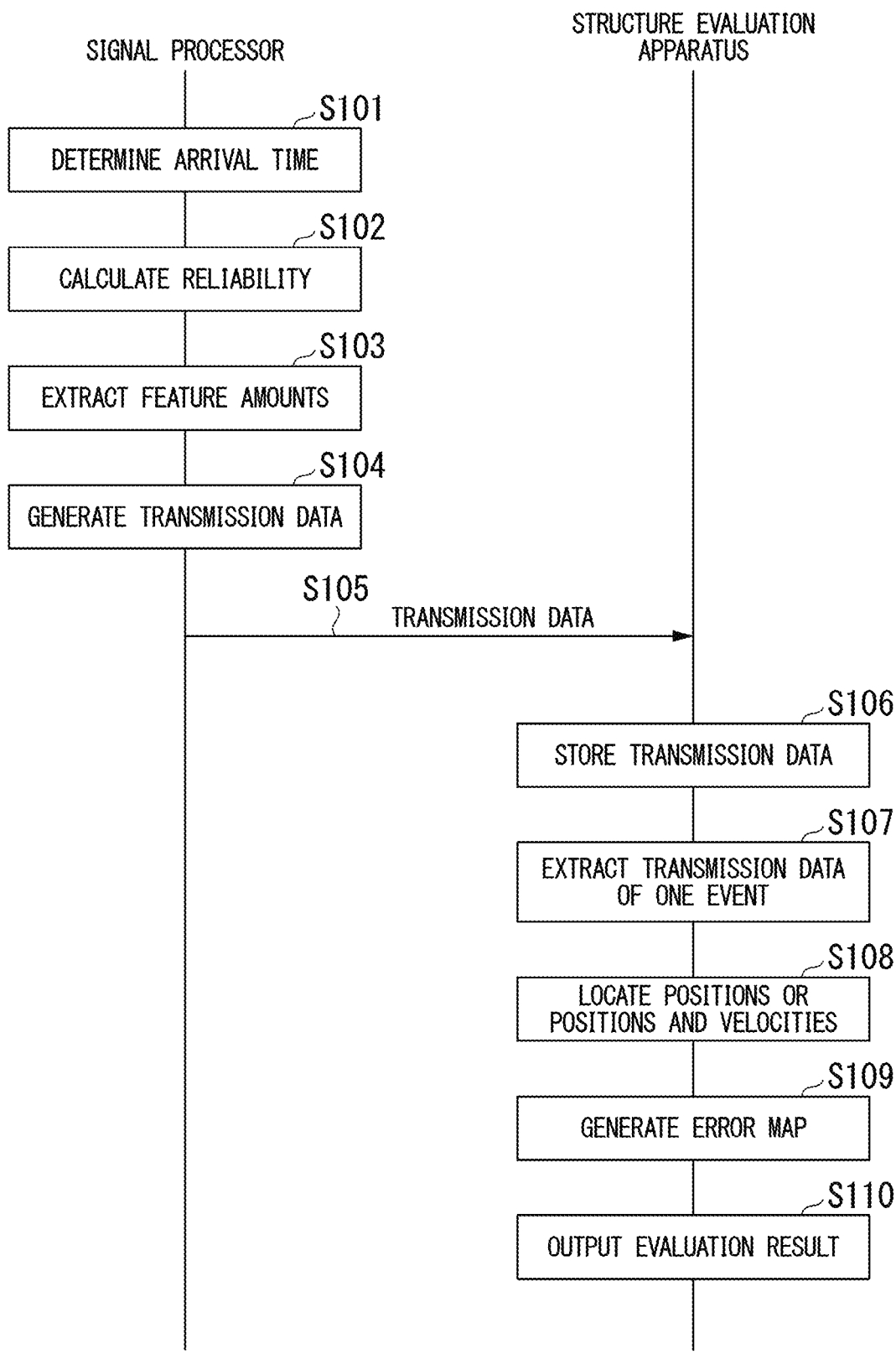
FIG. 7 is a sequence diagram showing a flow of processing of evaluating a deterioration state performed by the structure evaluation system according to the first embodiment.

FIG. 7 is a sequence diagram showing a flow of processing of evaluating a deterioration state performed by the structure evaluation system 100 according to the first embodiment. In the example shown in FIG. 7, processing after the first gate signal is output from the gate generation circuit 202 is shown.

The arrival time determiner 203 determines the first elastic wave arrival time $t_M$ and the second elastic wave arrival time $t_{TH}$ on the basis of a noise-removed elastic wave signal (Step S101). The arrival time determiner 203 outputs the determined time information to the reliability calculator 204 and the transmission data generator 206.

The reliability calculator 204 calculates the reliability of the noise-removed elastic wave signal on the basis of the time information obtained while the first gate signal is input (Step S102). For example, the reliability calculator 204 calculates the value related to the reciprocal of the time difference between the first elastic wave arrival time $t_M$ and the second elastic wave arrival time $t_{TH}$ as the reliability. The reliability calculator 204 outputs the information of the calculated reliability to the transmission data generator 206.

The feature amount extractor 205 extracts the feature amounts of the noise-removed elastic wave signal obtained while the first gate signal is input (Step S103). The transmission data generator 206 generates transmission data by causing the information acquired in processing from Step S101 to Step S103 to be associated (Step S104). The output unit 208 outputs the generated transmission data to the structure evaluation apparatus 30 (Step S105). Processing from Step S101 to Step S105 is executed every time an elastic wave is detected by the sensor 10 and the first gate signal is output. That is, every time the first gate signal is output, the first elastic wave arrival time $t_M$, the second elastic wave arrival time $t_{TH}$, the reliability, and the feature amounts are acquired.

The acquirer 311 acquires the transmission data output from the signal processor 20 and stores the acquired transmission data in the memory 312 (Step S106). The event extractor 313 extracts transmission data of one event from the transmission data stored in the memory 312 (Step S107). The event extractor 313 extracts more pieces of transmission data of one event than the number (for example, three) necessary for locating of positions and velocities. The event extractor 313 outputs the extracted transmission data to the position-velocity locator 314.

The position-velocity locator 314 locates the positions of the elastic wave source generated in one event or the positions and the velocities of an elastic wave on the basis of the transmission data of one event (Step S108). When the position-velocity locator 314 locates only the positions of the elastic wave source, the structure evaluation apparatus 30 may be provided with another functional unit for locating the velocities of an elastic wave. Hereinafter, a method of deriving the positions of the elastic wave source or the positions and the velocities of an elastic wave will be described specifically. A three-dimensional coordinate system having one sensor 10 of the plurality of sensors 10 as an origin is considered. When the number of sensors 10 is n, an arrival time difference $\Delta t_i$ between a sensor $S_0$ at the origin and another sensor $S_i$ ($i=1, 2$, and so on to $n-1$) is expressed by the following Expression 1 with the coordinates ($x_s$, $y_s$, $z_s$) of the elastic wave source, the coordinates ($a_i$, $b_i$, $c_i$) of the sensor Si, and the elastic wave propagation velocity v.

[Math. 1]

$$\Delta t_i = \frac{\sqrt{(x-a_i)^2 + (y-b_i)^2 + (z-c_i)^2} - \sqrt{x^2+y^2+z^2}}{v} \quad \text{(Expression 1)}$$

A value of observation is $t_i$, and a nonlinear simultaneous equation having unknowns of $n-1$ ($x_s$, $y_s$, $z_s$, v) with respect to the n sensors is established. The unknowns ($x_s$, $y_s$, $z_s$, v) can be obtained using various approximate analysis methods. The position-velocity locator 314 outputs the located positional information of the elastic wave source to the error map generator 315.

The error map generator 315 generates an error map on the basis of the information of the reliability and the time information included in the transmission data of a plurality of events output from the event extractor 313, and the positional information of the elastic wave source (Step S109).

First, the error map generator 315 divides the evaluation area of a structure into a plurality of sections. Next, the error map generator 315 estimates a velocity field distribution of a target area by adjusting a slowness S which is the reciprocal of the velocity of an elastic wave in each of the sections such that it matches the measurement value the most. An observation equation formulating this is expressed by Expression (2).

[Math. 2]

$$Y = HX + V \quad \text{(Expression 2)}$$

$$Y = \begin{pmatrix} t_1 \\ t_2 \\ \vdots \\ t_n \end{pmatrix}, H = \begin{bmatrix} l_{11} & l_{12} & \cdots & l_{1m} \\ l_{21} & l_{22} & \cdots & l_{2m} \\ \vdots & \vdots & \ddots & \vdots \\ l_{n1} & l_{n2} & \cdots & l_{nm} \end{bmatrix}, X = \begin{pmatrix} S_1 \\ S_2 \\ \vdots \\ S_m \end{pmatrix},$$

$$V \begin{pmatrix} v_1 \\ v_2 \\ \vdots \\ v_n \end{pmatrix}$$

In Expression (2), Y indicates a vector of the measurement value (arrival time), H indicates an observation matrix, X indicates a vector of the unknown parameter (slowness), and V indicates a vector of a measurement error. An element $l_{ij}$ (i and j are integers of 1 or larger) of the observation matrix H indicates a length of a line segment of an elastic wave measured in the sensor 10-$i$ passing through the section j. In order to acquire a solution which matches this simultaneous equation as much as possible, X which minimizes some objective function is obtained. Hereinafter, an objective function when a Kalman filter is used will be described. An objective function is expressed by the following Expression (3).

[Math. 3]

$$\min \cdot J(X) = (Y-HX)^T R^{-1}(Y-HX) + (X-\overline{X})^T P^{-1}(X-\overline{X}) \quad \text{(Expression 3)}$$

In Expression (3), X− (− is larger than X, and the same applies hereinafter) indicates an estimation value of X, P indicates an estimated error covariance matrix of X, and R indicates a measurement error covariance matrix having $\Delta t$ as a diagonal component. The reciprocal of R corresponds to the value related to the reciprocal of the time difference between. The factor X^ (^ is larger than X, and the same applies hereinafter) minimizing this Expression (3) is applied by the following Expression (4).

[Math. 4]

$$\hat{X}_k = \hat{X}_{k-1} + K_k(Y - H\hat{X}_{k-1})$$

$$P_k = (P_{k-1}^{-1} + H^T R^{-1} H)^{-1}$$

$$K_k = P_k H^T R^{-1} \quad \text{(Expression 4)}$$

The diagonal term of P indicates an estimated error variance of the parameter X, and the square root thereof corresponds to an estimated error. That is, the error map generator 315 obtains an estimated error map (error map) of the evaluation area by mapping the diagonal term of P in each section with the corresponding section. Here, with regard to an updating expression of P, it is ascertained that P has a large value (is not updated) when each element of the observation matrix H has no value or the diagonal component Δt of the measurement error covariance matrix R has a large value. The error map generator 315 outputs the generated error map to the display 32. As an evaluation result, the display 32 displays the generated error map in a contour diagram corresponding to the fluctuation of the error (Step S110).

In the structure evaluation system 100 having a configuration as described above, the integrated value of a value related to the reciprocal of the time difference between the first elastic wave arrival time $t_M$ and the second elastic wave arrival time $t_{TH}$ is acquired as the reliability for each of the elastic waves detected by the sensor 10, and the error map is generated using the acquired reliability. When poor adhesion of the sensor 10 occurs, the error of an area within the error map corresponding to an area on the path from the elastic wave source to the sensor 10 having poor adhesion increases. In this manner, in the structure evaluation system 100, a user of the system easily finds the factor of decrease in the accuracy of evaluating the deterioration state of a structure. When a range having a significant estimated error expands, a user of the system can perform investigation in consideration of the problem such as poor adhesion of the sensor 10. In this manner, the accuracy of evaluating the deterioration state of a structure can be improved.

In addition, a user of the system can estimate that an evaluation result of an area having a large estimated error is not reliable due to some factor by looking at the error map. Therefore, it is possible to prompt a user to artificially generate an elastic wave or the like and to perform measurement again for the area having a large estimated error. For this reason, it is easy to find a factor of decrease in the accuracy of evaluating a structure. Accordingly, it is possible to cope with such a factor.

Second Embodiment

A second embodiment has a configuration different from that of the first embodiment in that an evaluator further generates a velocity field map in addition to an error map. Hereinafter, only the difference will be described.

Figure 8:
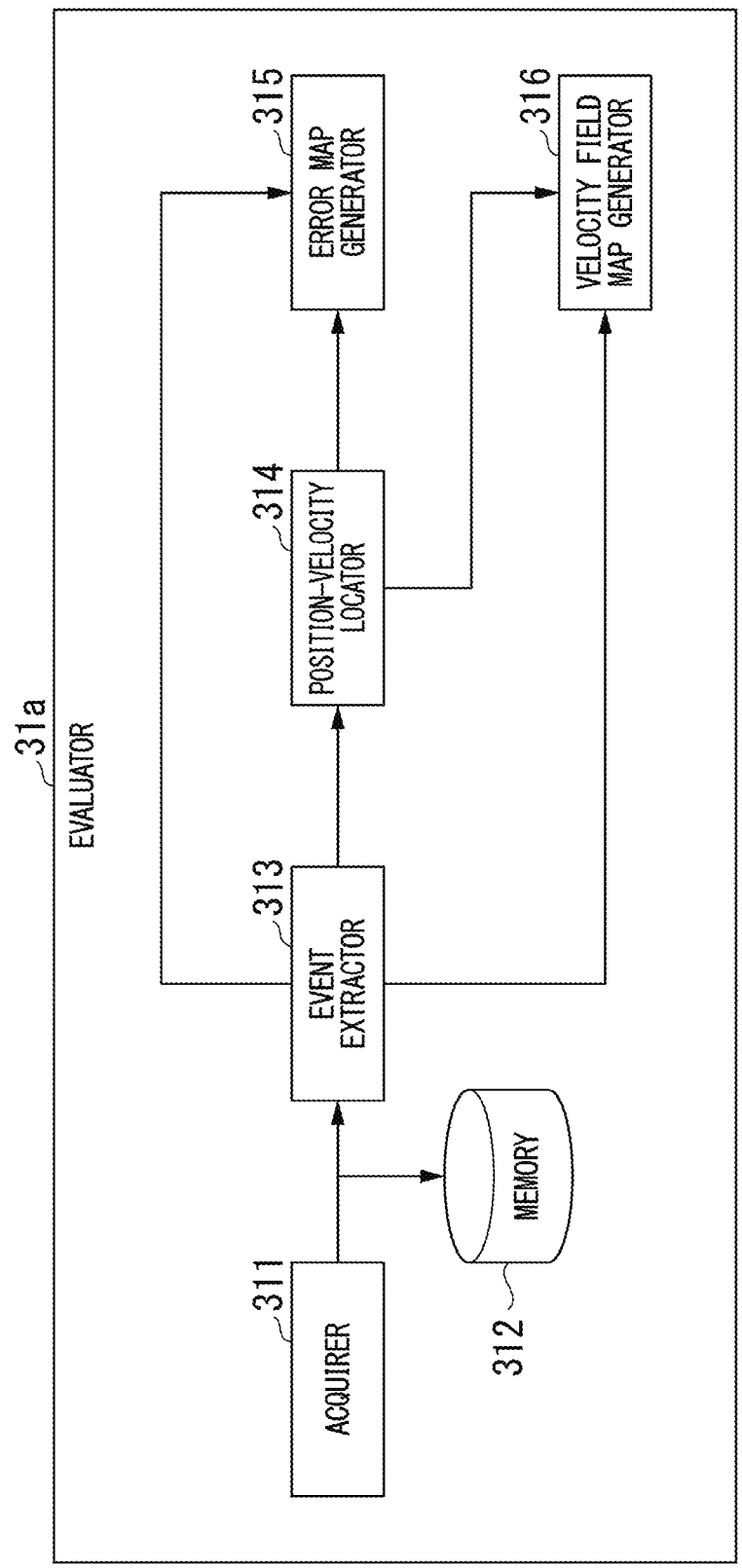
FIG. 8 is a schematic block diagram showing a function of the evaluator according to a second embodiment.

FIG. 8 is a schematic block diagram showing a function of an evaluator 31a according to the second embodiment. The evaluator 31a includes the acquirer 311, the memory 312, the event extractor 313, the position-velocity locator 314, the error map generator 315, and a velocity field map generator 316.

The velocity field map generator 316 generates a velocity field map (second map) on the basis of the information of the reliability and the time information included in the transmission data of one event output from the event extractor 313 and the positions of the elastic wave source or the positions and the velocities of an elastic wave located by the position-velocity locator 314. The velocity field map indicates a distribution diagram in which the evaluation area is divided into a plurality of sections and values indicating the propagation velocities of elastic waves generated in a structure are allocated to the respective sections. That is, the velocity field map is a distribution diagram in which the propagation velocities of elastic waves are indicated in the evaluation area. In addition, when the position-velocity locator 314 locates only the positions of the elastic wave source, the velocity field map generator 316 locates the velocities of elastic waves in the structure evaluation apparatus 30. That is, the velocity field map generator 316 may locate the velocities of elastic waves when information located to the velocities of elastic waves is not obtained from the position-velocity locator 314. Various kinds of regularization least squares method such as a method of using a Kalman filter as in Expression (3) or a least squares method can be used for generating a velocity field map.

Figure 9:
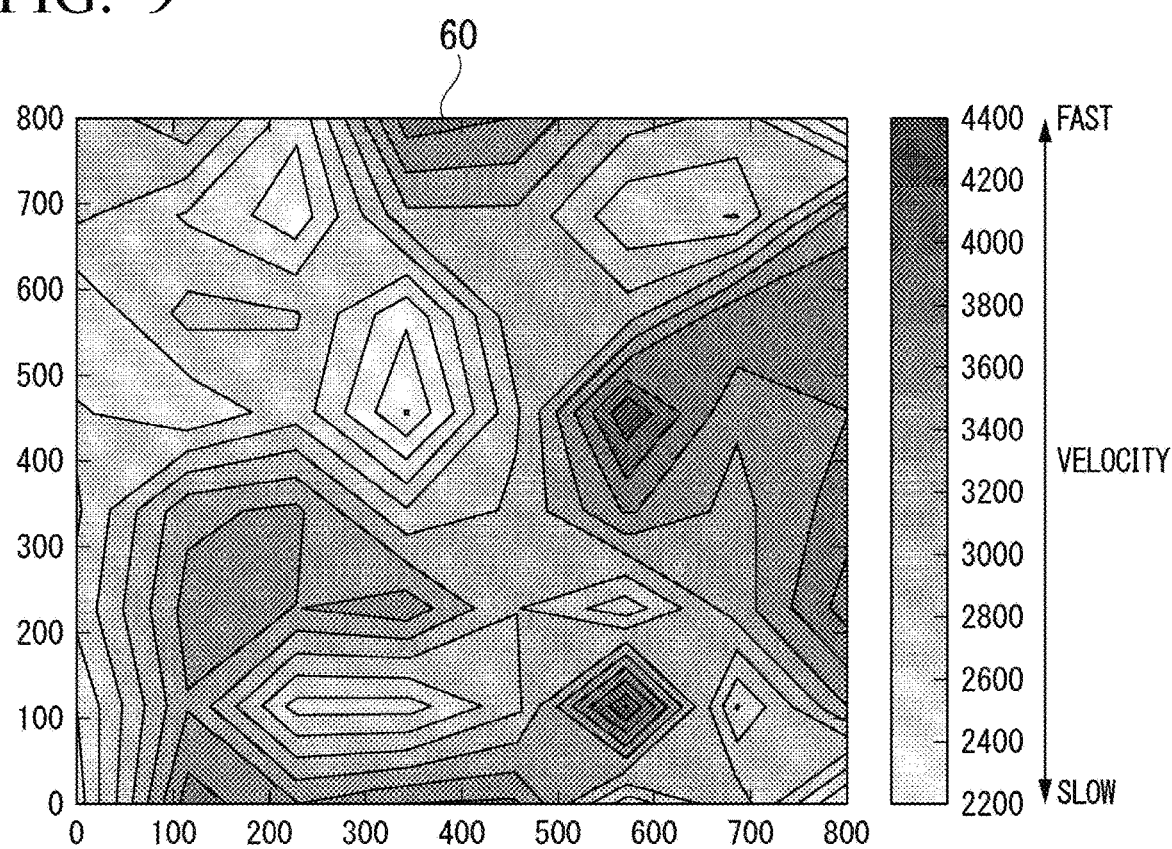
FIG. 9 is a view showing a specific example of a velocity field map according to the present embodiment.

FIG. 9 is a view showing a specific example of a velocity field map according to the present embodiment.

A velocity field map 60 shown in FIG. 9 is generated using information obtained under the same environment as the error map 50 shown in FIG. 6. In FIG. 9, the velocity field map 60 is shown as a contour diagram in which elastic waves are generated by applying 25 impacts to a concrete floor slab.

When there is a problem of poor installation of the sensor 10, the velocity drops around the sensor 10 in which poor installation has occurred. This is because the sensor 10-1 and the sensor 10-2 have a problem of poor adhesion. In the velocity field map 60, it is assumed that the area of a low velocity is slightly displaced upward from the damage area 41 shown in FIG. 4 because the arrival times of elastic waves are estimated in a delayed manner due to poor adhesion of the sensor 10-1 and thus the area of a low velocity is dragged upward.

Meanwhile, in the error map 50, there is a significant error straddling around the sensor 10-1 and the sensor 10-2. This denotes that there has been decrease in SN due to poor adhesion of the sensor 10-1 and the sensor 10-2.

Figure 10:
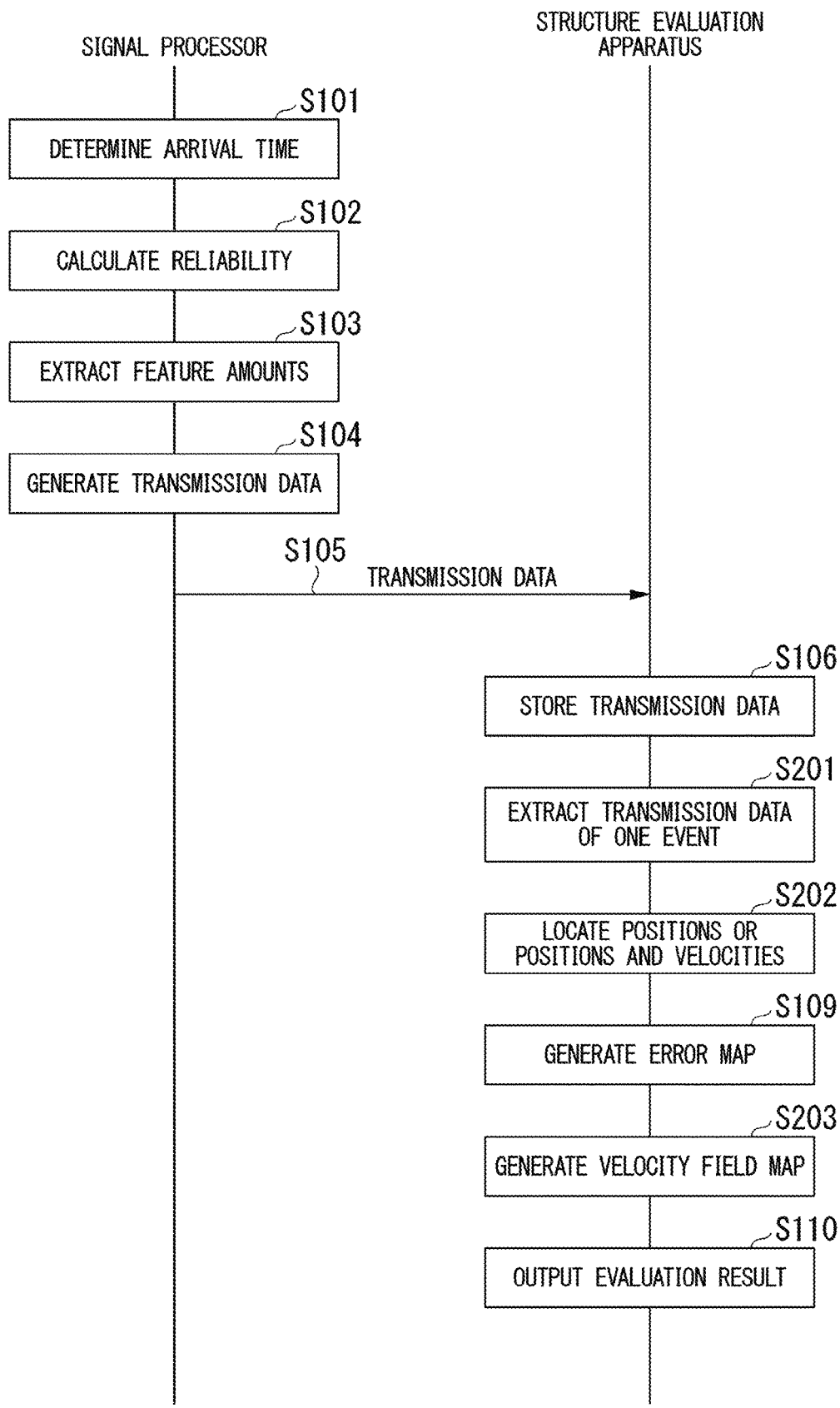
FIG. 10 is a sequence diagram showing a flow of processing of evaluating the deterioration state performed by the structure evaluation system according to the second embodiment.

FIG. 10 is a sequence diagram showing a flow of processing of evaluating the deterioration state performed by the structure evaluation system 100 according to the second embodiment. In FIG. 10, reference signs similar to those in FIG. 7 are applied in processing similar to that in FIG. 7, and description thereof is omitted.

The event extractor 313 extracts transmission data of one event from the transmission data stored in the memory 312 (Step S201). The event extractor 313 outputs the extracted transmission data to the position-velocity locator 314 and the error map generator 315.

The position-velocity locator 314 locates the positions of the elastic wave source or the positions and the velocities of an elastic wave generated in one event on the basis of the extracted transmission data of one event (Step S202). The position-velocity locator 314 outputs the located positional information of the elastic wave source to the error map generator 315. In addition, the position-velocity locator 314 outputs the positional information and the velocity information of the elastic wave to the velocity field map generator 316. The velocity field map generator 316 generates a velocity field map on the basis of the information of the reliability and the time information included in the transmission data of one event output from the event extractor 313, and the positional information of the elastic wave source or the positional information and the velocity information of the elastic wave (Step S203). Accordingly, the structure evaluation apparatus 30 evaluates the deterioration state of a structure.

According to the structure evaluation system 100 of the second embodiment having a configuration as described above, the structure evaluation apparatus 30 generates not only the error map 50 but also the velocity field map 60. Therefore, a user of the system is able to not only determine the degree of accuracy of the estimation result but also more accurately find the detected abnormality such as poor adhesion of the sensor 10 by comparing the error map 50 and the velocity field map 60 to each other.

Third Embodiment

A third embodiment has a configuration different from those of the first embodiment and the second embodiment in that a signal processor corrects an arrival time. Hereinafter, only the difference will be described.

Figure 11:
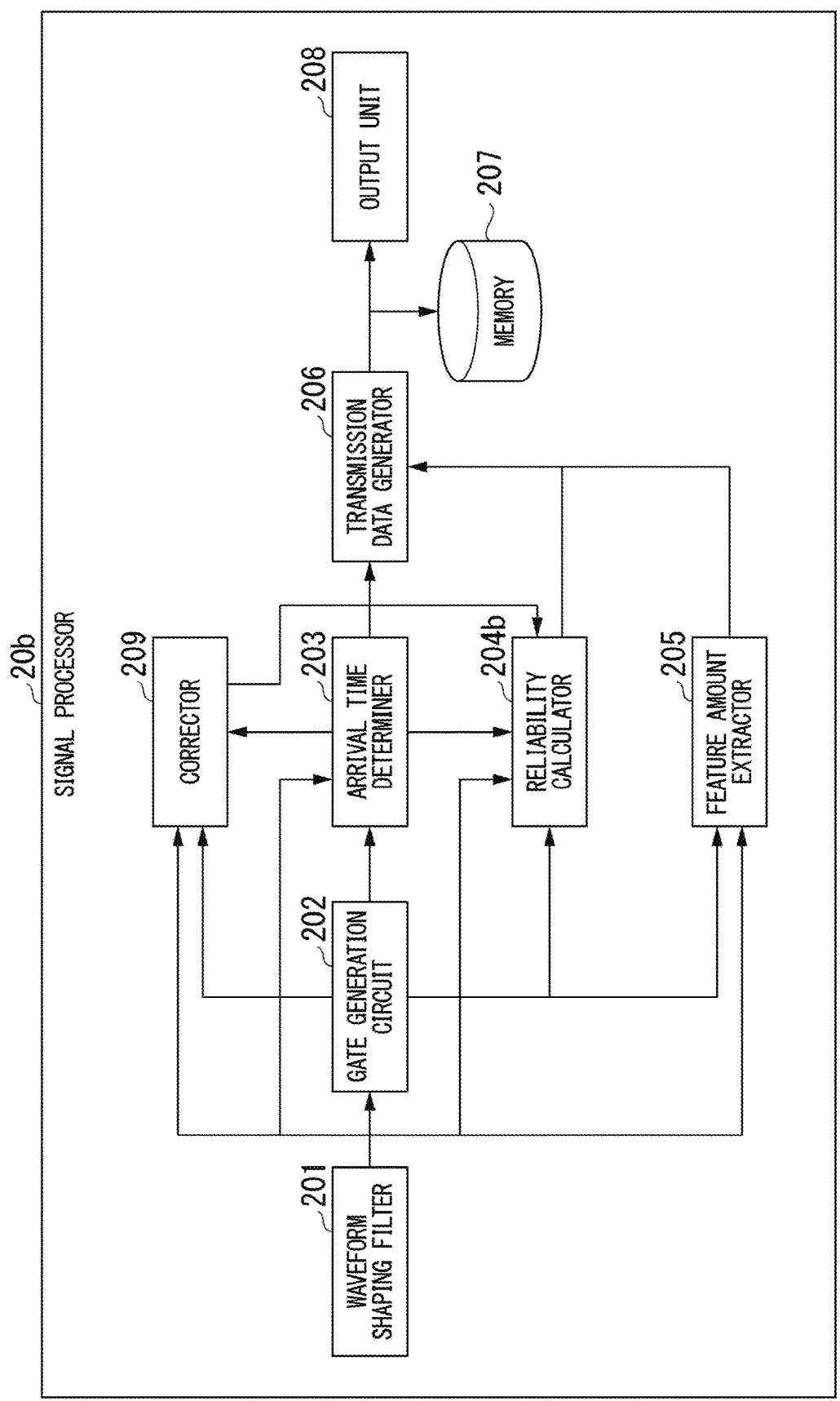
FIG. 11 is a schematic block diagram showing a function of a signal processor according to a third embodiment.

FIG. 11 is a schematic block diagram showing a function of a signal processor 20b according to the third embodiment. The signal processor 20b includes the waveform shaping filter 201, the gate generation circuit 202, the arrival time determiner 203, a reliability calculator 204b, the feature amount extractor 205, the transmission data generator 206, the memory 207, the output unit 208, and a corrector 209.

The corrector 209 corrects the arrival time of the sensor 10 having a possibility of occurrence of abnormality on the basis of the elastic wave detected by each sensor 10. Specifically, first, the corrector 209 acquires a noise-removed elastic wave signal based on the elastic wave detected by one sensor 10 for a predetermined period of time. Accordingly, the corrector 209 acquires a plurality of noise-removed elastic wave signals based on the elastic waves detected by one sensor 10. Next, the corrector 209 acquires the first elastic wave arrival time $t_M$ and the second elastic wave arrival time $t_M$ of each of the plurality of acquired noise-removed elastic wave signals from the arrival time determiner 203. The corrector 209 calculates the time difference on the basis of the first elastic wave arrival time $t_M$ and the second elastic wave arrival time $t_{TH}$ which have been acquired. The corrector 209 calculates the average and the variance of a plurality of calculated time differences. The corrector 209 executes the foregoing processing for each sensor 10.

The corrector 209 judges the sensor 10 of which the value of the average or the variance is equal to or larger than a threshold as the sensor 10 having a possibility of occurrence of abnormality. Abnormality of the sensor 10 includes poor adhesion, malfunction, and the like. Regarding the sensor 10 having a possibility of occurrence of abnormality, the corrector 209 corrects the arrival time of the sensor 10 having a possibility of occurrence of abnormality by decreasing the threshold for determining the first elastic wave arrival time $t_M$. For example, when the sensor 10-1 and the sensor 10-2 are judged as the sensor 10 having a possibility of occurrence of abnormality, the corrector 209 decreases the threshold for determining the first elastic wave arrival time $t_M$ in the sensor 10-1 and the sensor 10-2.

Figure 12A:
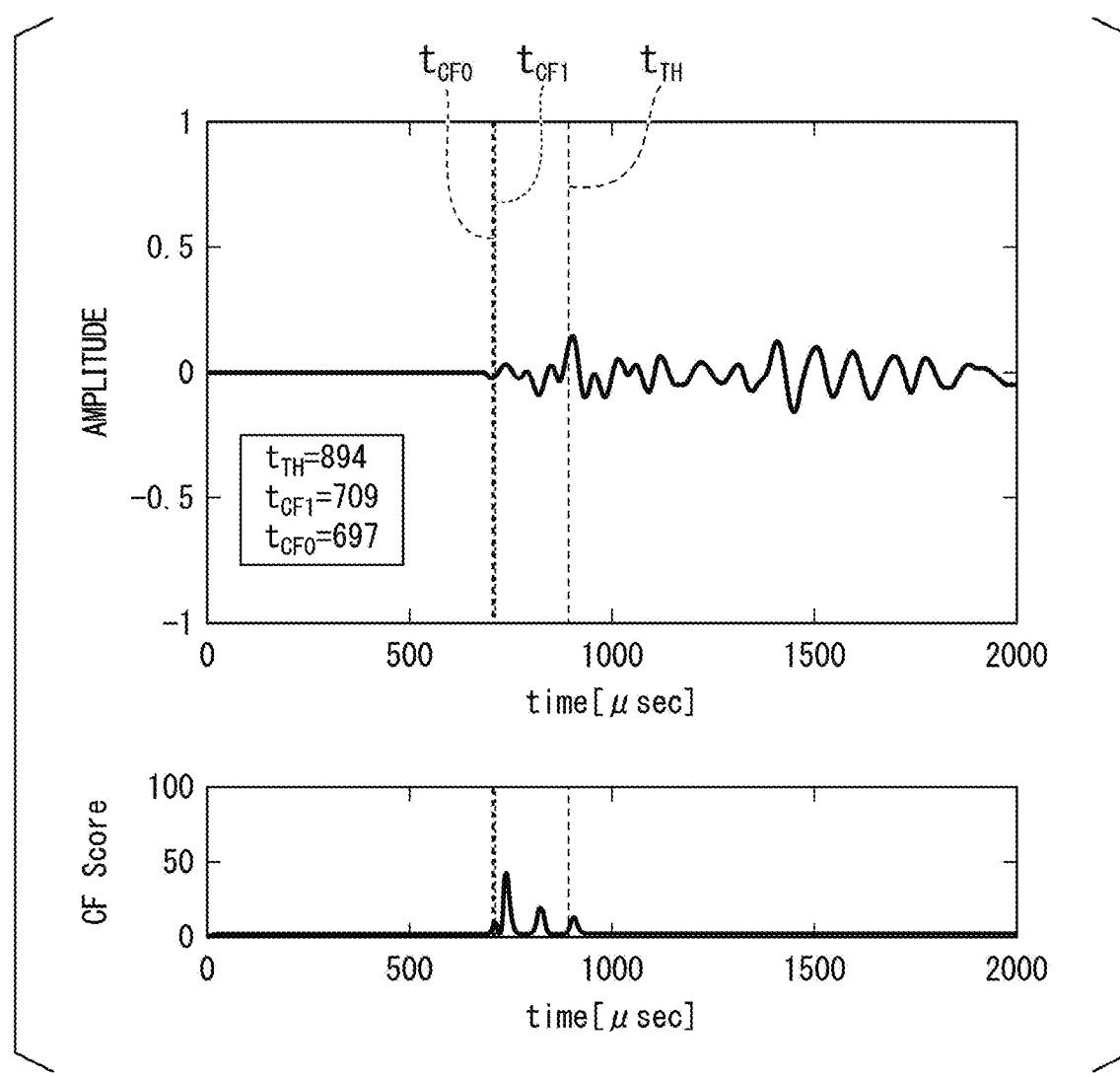
FIG. 12A is a view showing a waveform of an elastic wave detected by the sensor.
Figure 12B:
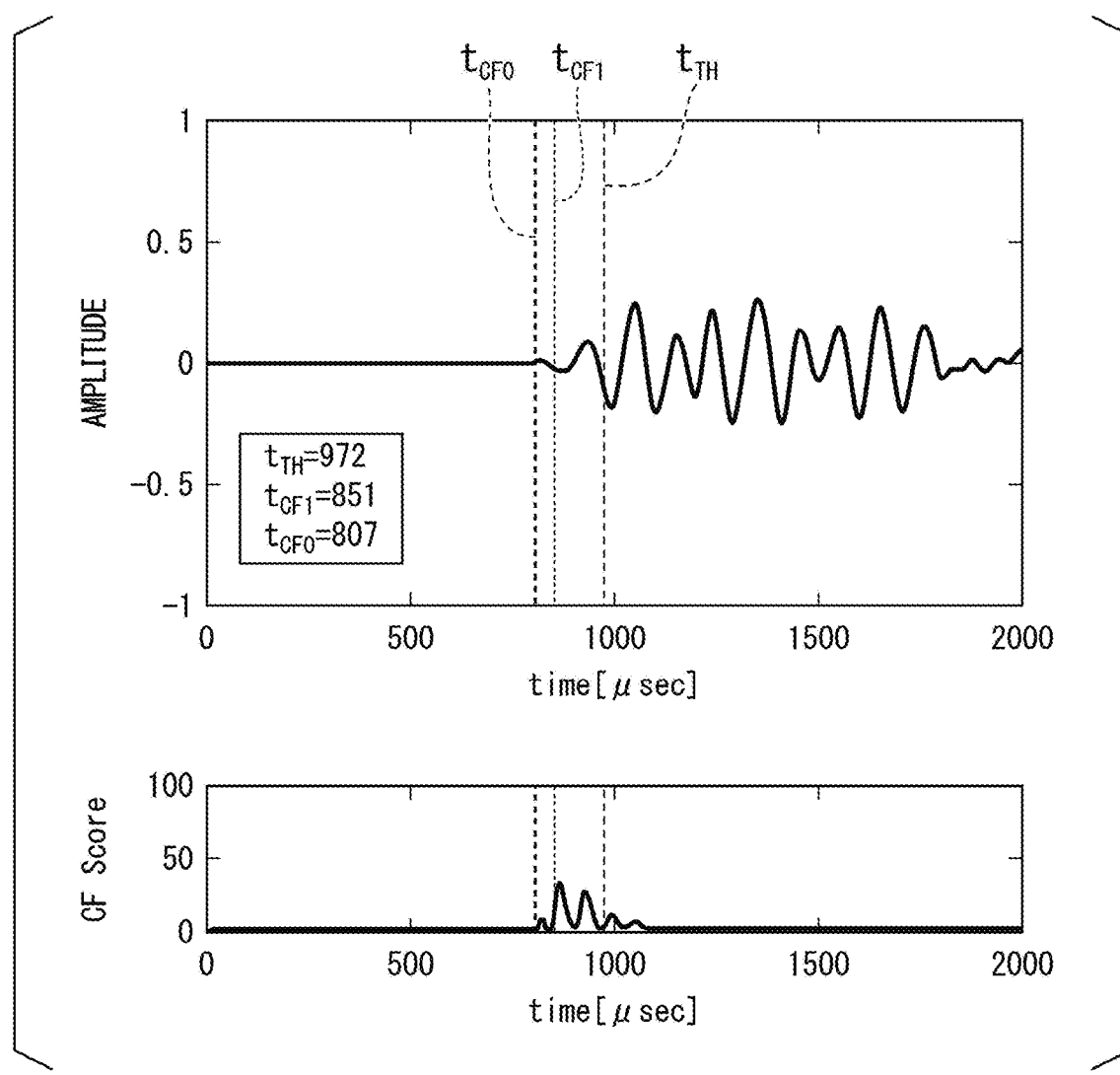
FIG. 12B is a view showing a waveform of an elastic wave detected by the sensor.

FIG. 12A shows a waveform of an elastic wave detected by the sensor 10-1, and FIG. 12B shows a waveform of an elastic wave detected by the sensor 10-2. In the upper diagrams in FIGS. 12A and 12B, the vertical axis indicates an amplitude of an elastic wave, and the horizontal axis indicates a time. In addition, in the lower diagrams in FIGS. 12A and 12B, the vertical axis indicates a score of the CF, and the horizontal axis indicates a time. In FIGS. 12A and 12B, the time $t_{CF1}$ is the first elastic wave arrival time $t_M$ obtained by the arrival time determiner 203 using the technique of ChangeFinder. In FIGS. 12A and 12B, the time $t_{TH}$ is the second elastic wave arrival time $t_{TH}$. In FIGS. 12A and 12B, a time $t_{CF0}$ is the corrected first elastic wave arrival time $t_M$. As shown in FIGS. 12A and 12B, it is ascertained that the first elastic wave arrival time $t_M$ detected by the sensor 10 having a possibility of occurrence of abnormality is detected at a time earlier than it is corrected.

In addition, the corrector 209 calculates the average and the variance of the time differences of all the sensors 10. Thereafter, the corrector 209 standardizes the average and the variance of the sensors 10 on the basis of the average and the variance of the time differences of all the sensors 10. Here, standardization denotes that the average and the variance of the sensors 10 are approximated to the average and the variance of the time differences of all the sensors 10. Accordingly, discrepancy in detection sensitivity of each sensor 10 is adjusted. The corrector 209 outputs the average and the variance value of the time differences of each of the standardized sensors 10 to the reliability calculator 204b.

The reliability calculator 204b outputs the obtained variance value to the transmission data generator 206 as the reliability for each sensor 10.

Figure 13A:
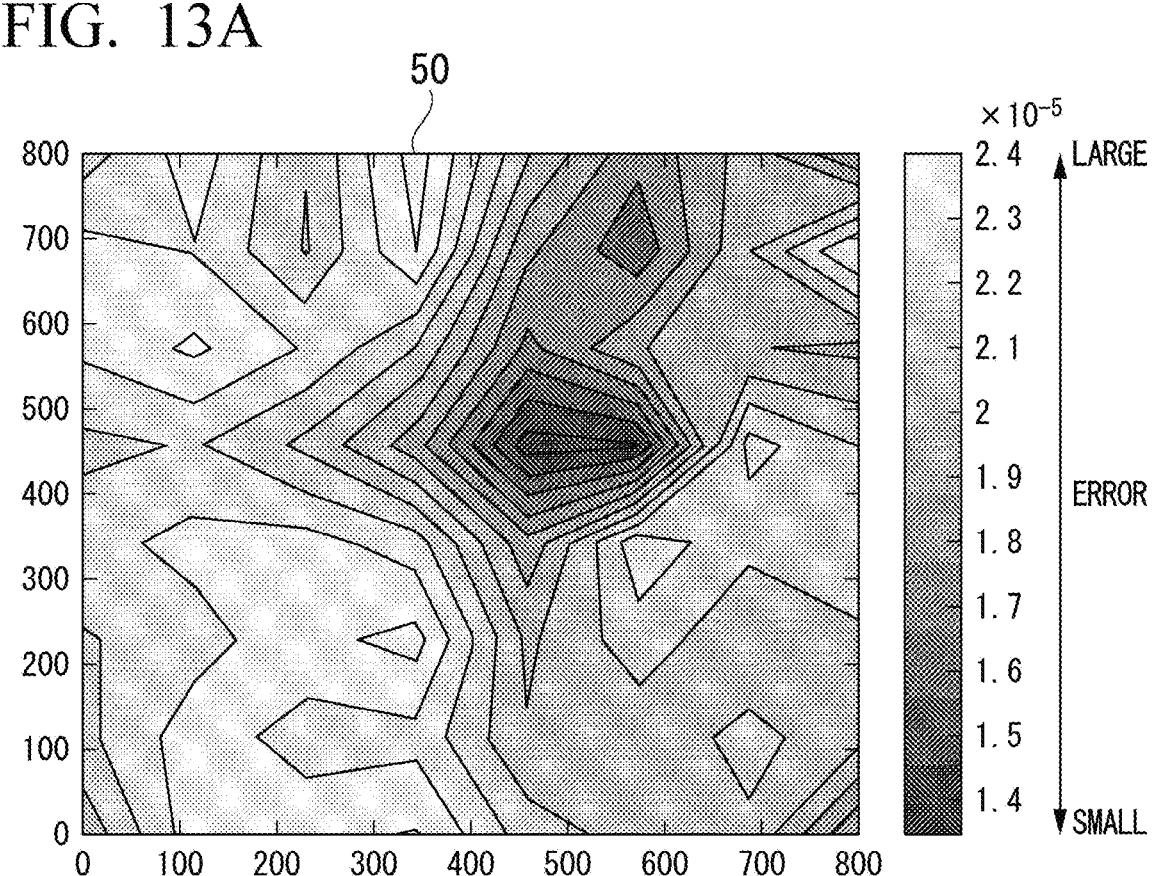
FIG. 13A is a view showing a specific example of the error map according to the present embodiment.
Figure 13B:
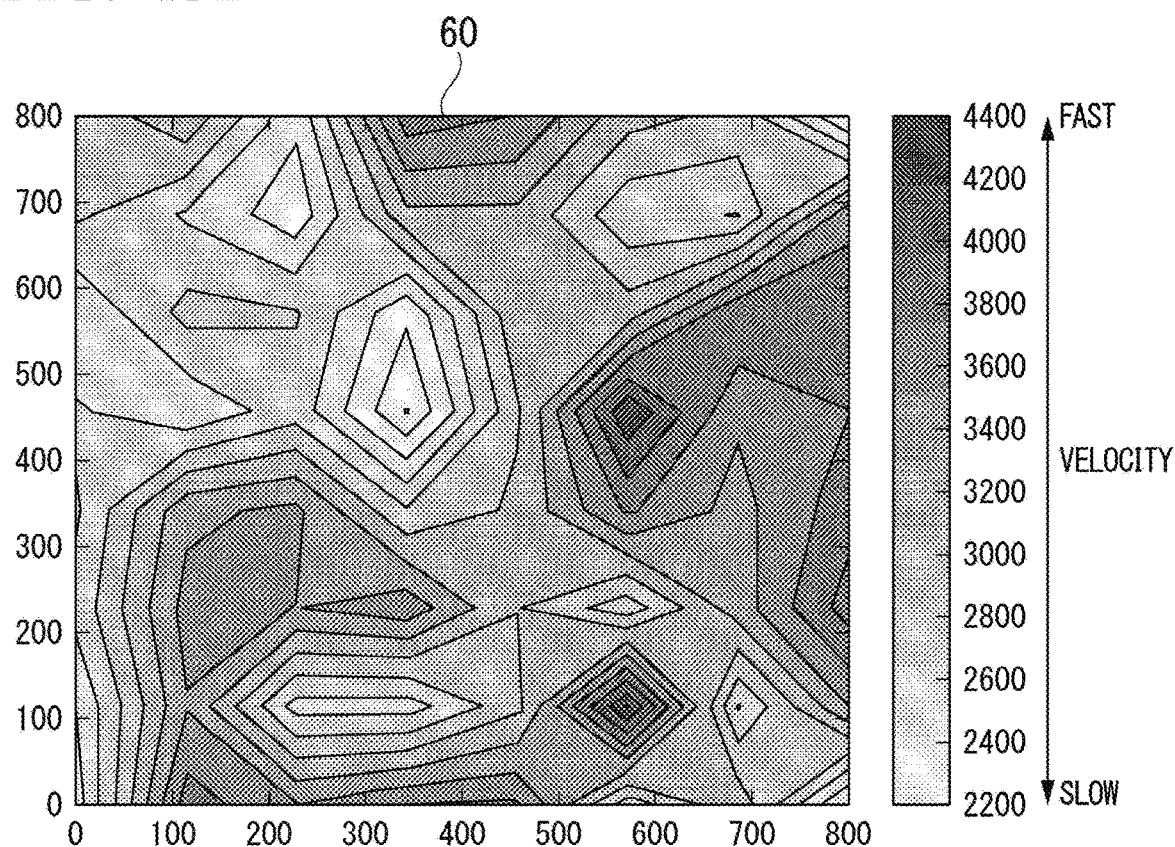
FIG. 13B is a view showing a specific example of the velocity field map according to the present embodiment.
Figure 13C:
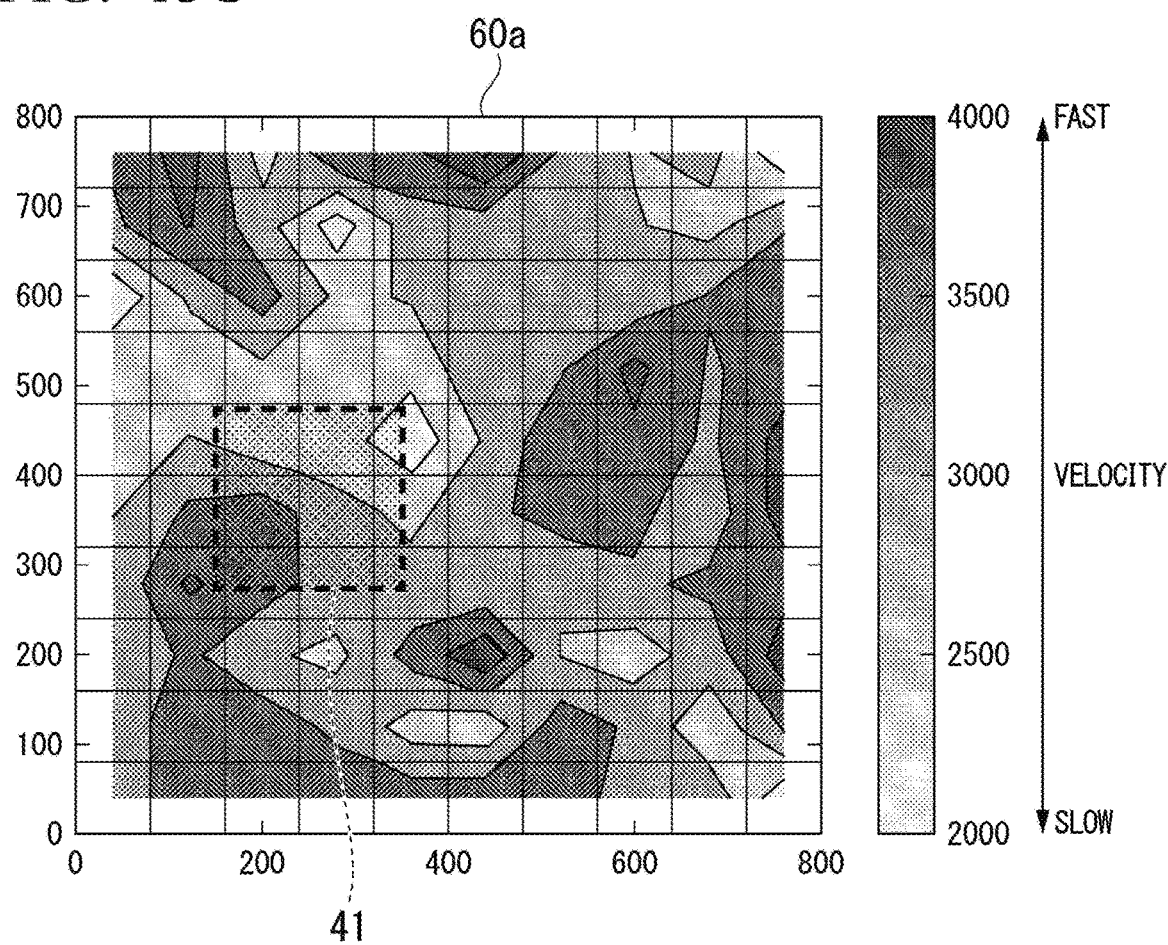
FIG. 13C is a view showing a specific example of a corrected velocity field map according to the present embodiment.

FIG. 13A is a view showing a specific example of the error map 50, FIG. 13B is a view showing a specific example of the velocity field map 60, and FIG. 13C is a view showing a specific example of a corrected velocity field map 60a generated on the basis of the arrival time.

As shown in FIG. 13C, it is ascertained that the result has changed due to the corrected arrival time compared to the velocity field map 60 shown in FIG. 13B. For example, it is ascertained that the area (damage area 41) in which deterioration has occurred inside the structure is indicated more clearly in FIG. 13C than in FIG. 13B.

According to the structure evaluation system 100 of the third embodiment having a configuration as described above, the corrector 209 corrects the first elastic wave arrival time $t_M$ of the elastic wave detected by the sensor 10 having a possibility of occurrence of abnormality. For example, the corrector 209 corrects the first elastic wave arrival time $t_M$ of the elastic wave detected by the sensor 10 having a possibility of occurrence of abnormality such that it becomes earlier than the first elastic wave arrival time $t_M$ determined by the arrival time determiner 203. Accordingly, even when an elastic wave is not detected due to abnormality such as poor adhesion at a time at which it is supposed to be detected originally, the time can be approximated to the original detection time. For this reason, decrease in the accuracy of evaluating the deterioration state of a structure can be curbed.

Fourth Embodiment

A fourth embodiment has a configuration different from those of the first embodiment to the third embodiment in that an evaluator evaluates a measurement result. Hereinafter, only the difference will be described.

Figure 14:
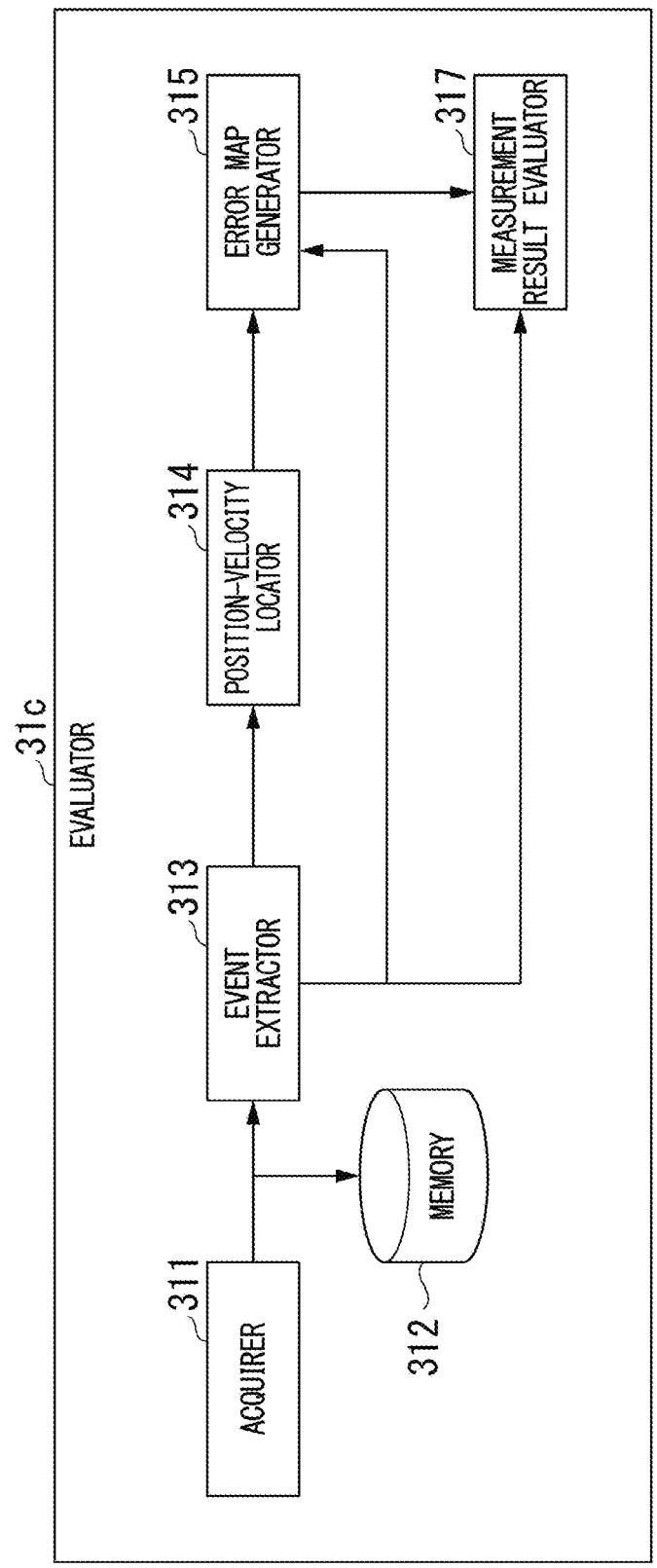
FIG. 14 is a schematic block diagram showing a function of an evaluator according to a fourth embodiment.

FIG. 14 is a schematic block diagram showing a function of an evaluator 31c according to the fourth embodiment. The evaluator 31c includes the acquirer 311, the memory 312, the event extractor 313, the position-velocity locator 314, the error map generator 315, and a measurement result evaluator 317.

The measurement result evaluator 317 performs evaluation regarding a damage area within the evaluation area or a possibility of occurrence of abnormality in the sensor 10 on the basis of the reliability. Specifically, with reference to the error map generated by the error map generator 315, the measurement result evaluator 317 judges an area in which a value indicated for the reliability is equal to or smaller than the threshold as a damage area or an area in which the evaluation result is low due to abnormality of the sensor 10. Abnormality of the sensor 10 includes poor adhesion, malfunction, and the like.

The measurement result evaluator 317 causes the display 32 to display a judgement result. Specifically, the measurement result evaluator 317 causes the display 32 to display that an area in which the value indicated for the reliability is equal to or smaller than the threshold is a damage area or an area in which the evaluation result is low due to abnormality of the sensor 10. For example, the measurement result evaluator 317 causes the display 32 to display a judgement result by displaying a pop-up window, a text balloon, or the like.

According to the structure evaluation system 100 of the fourth embodiment having a configuration as described above, the evaluator 31c judges a damage area or an area in which the evaluation result is low due to abnormality of the sensor 10 on the basis of the reliability. Further, the evaluator 31c causes the display 32 to display a judgement result. Accordingly, an evaluation result can be provided to a user of the system. A user of the system can fix the poor adhesion of the sensor 10 or ascertain a damage area with reference to the provided evaluation result.

Hereinafter, a modification example of the structure evaluation system 100 according to the fourth embodiment will be described.

The evaluator 31c may be configured to include the velocity field map generator 316 described in the second embodiment. In the case of such a configuration, the measurement result evaluator 317 is configured to evaluate a damage area or a possibility of occurrence of abnormality in the sensor 10 on the basis of the error map and the velocity field map. Specifically, the measurement result evaluator 317 judges an area in which a value indicated for the reliability is equal to or smaller than the threshold in the error map and an area in which the value of the velocity is equal to or smaller than the threshold in the velocity field map as a damage area or an area in which the evaluation result is low due to abnormality of the sensor 10. An area in which a value indicated for the reliability is equal to or smaller than the threshold and an area in which the value of the velocity is equal to or smaller than the threshold in the velocity field map are caused by an elastic wave which is detected in a delayed manner due to deterioration inside a structure or abnormality of the sensor 10, or the like. Therefore, the evaluator 31c can more accurately judge a damage area or an area in which the evaluation result is low due to abnormality of the sensor 10 by performing evaluation using two maps such as the error map and the velocity field map.

Fifth Embodiment

Figure 15:
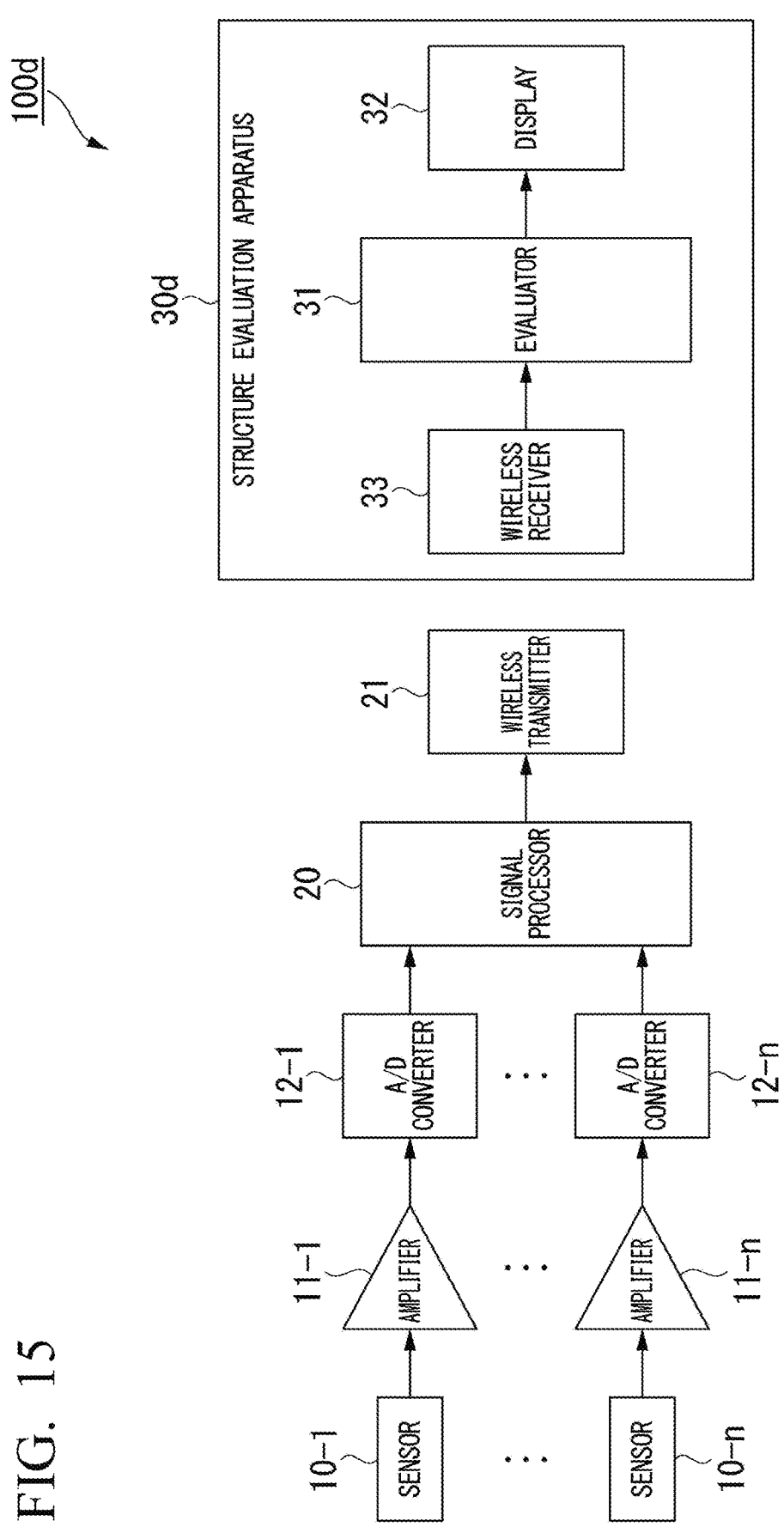
FIG. 15 is a view showing a system configuration of a structure evaluation system according to a fifth embodiment.

FIG. 15 is a view showing a system configuration of a structure evaluation system 100d according to a fifth embodiment. The structure evaluation system 100d includes a plurality of sensors 10-1 to 10-n, a plurality of amplifiers 11-1 to 11-n, a plurality of A/D converters 12-1 to 12-n, the signal processor 20, a wireless transmitter 21, and a structure evaluation apparatus 30d. The structure evaluation apparatus 30d includes the evaluator 31, the display 32, and a wireless receiver 33. In the fifth embodiment, the signal processor 20 and the structure evaluation apparatus 30d are connected to each other through wireless communication. In this case, the wireless transmitter 21 transmits transmission data output from the signal processor 20 to the structure evaluation apparatus 30d. The wireless receiver 33 receives the transmission data transmitted from the wireless transmitter 21 and outputs the received transmission data to the evaluator 31. For example, a so-called industry science medical band (ISM band) such as a band of 2.4 GHz or 920 MHz (915 MHz to 928 MHz in Japan) can be used as the wireless frequency band between the wireless transmitter 21 and the wireless receiver 33.

Due to such a configuration, as sensor nodes, the sensor 10, the amplifier 11, the A/D converter 12, the signal processor 20, and the wireless transmitter 21 are installed in a structure such as a bridge (evaluation target), the structure evaluation apparatus 30d can be installed in a monitoring room, and the deterioration state of the structure can be monitored from a remote place.

The structure evaluation system 100d may be configured to include the signal processor 20b in place of the signal processor 20.

The structure evaluation system 100d may be configured to include either the evaluator 31a or the evaluator 31c in place of the evaluator 31.

The structure evaluation system 100d may be modified in a manner similar to that of the fourth embodiment.

Sixth Embodiment

Figure 16:
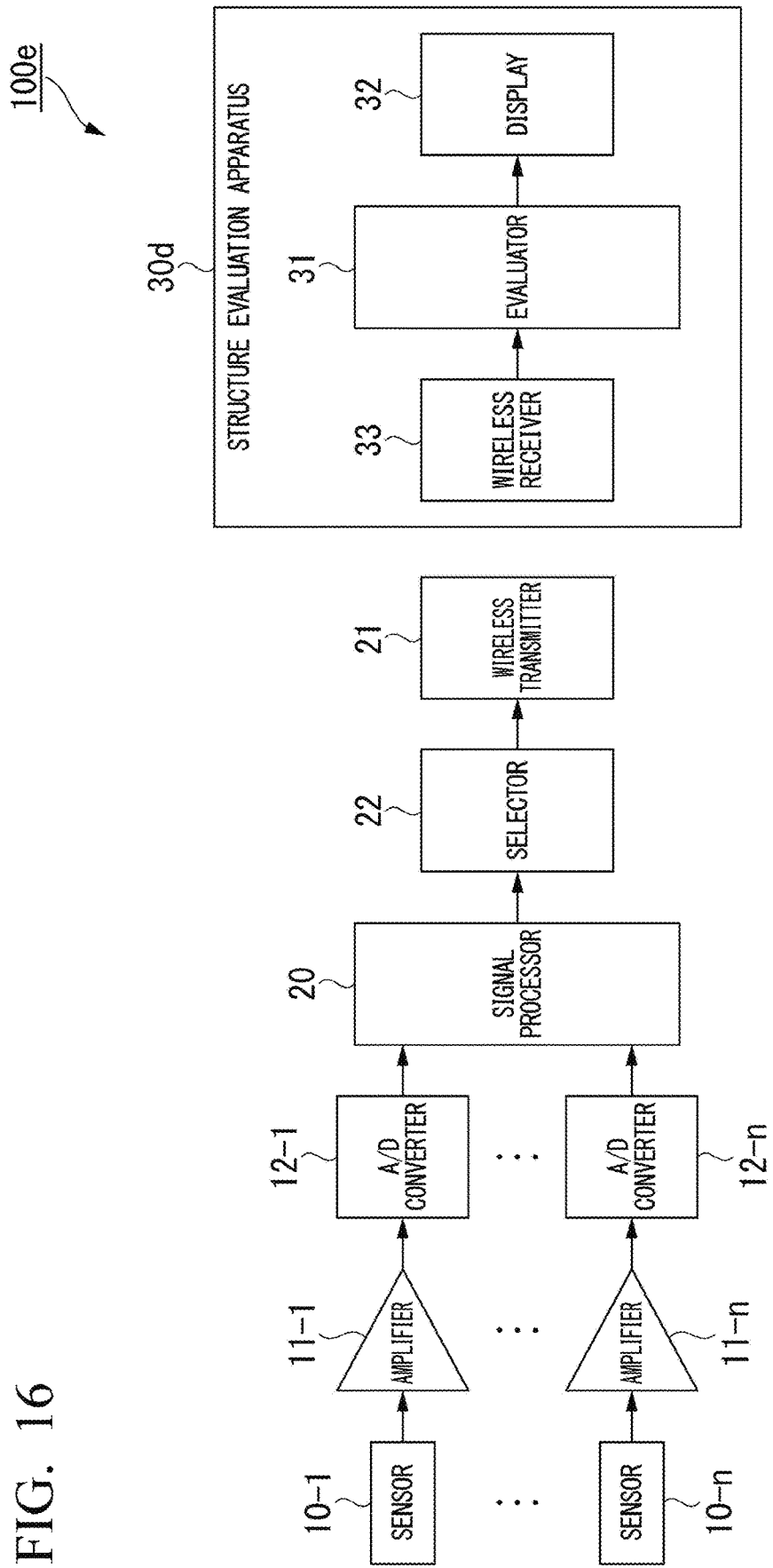
FIG. 16 is a view showing a system configuration of a structure evaluation system according to a sixth embodiment.

FIG. 16 is a view showing a system configuration of a structure evaluation system 100e according to a sixth embodiment. The structure evaluation system 100e includes a plurality of sensors 10-1 to 10-n, a plurality of amplifiers 11-1 to 11-n, a plurality of A/D converters 12-1 to 12-n, the signal processor 20, the wireless transmitter 21, a selector 22, and the structure evaluation apparatus 30d. The selector 22 selects transmission data to be utilized for evaluation in accordance with information of the feature amounts. Specifically, the selector 22 outputs only the transmission data in which the amplitude in the feature amounts of a signal is equal to or larger than the predetermined threshold to the wireless transmitter 21.

Due to such a configuration, transmission of unnecessary noise information as transmission data is curbed, and power consumption on the transmission side can be reduced. In addition, deterioration in evaluation of a structure due to transmission of unnecessary noise information as transmission data can also be curbed.

Wired connection may be adopted between the selector 22 and the structure evaluation apparatus 30d. In the case of such a configuration, the selector 22 outputs select transmission data to the structure evaluation apparatus 30d through wire communication. In the case of such a configuration, the structure evaluation system 100e does not have to include the wireless transmitter 21 and the wireless receiver 33.

The structure evaluation system 100e may include the signal processor 20b in place of the signal processor 20.

The structure evaluation system 100e may be configured to include either the evaluator 31a or the evaluator 31c in place of the evaluator 31.

The structure evaluation system 100e may be modified in a manner similar to that of the fourth embodiment.

Hereinafter, a modification example common to each of the embodiments will be described.

The amplifier 11 may be built into the sensor 10. In the case of such a configuration, the structure evaluation system 100 does not have to include the amplifier 11.

The error map generator 315 and the velocity field map generator 316 may be realized as one map generator.

Some or all of the functional units included in the structure evaluation apparatus 30 may be included in a different casing. For example, the structure evaluation apparatus 30 may include only the evaluator 31, and the display 32 may be included in a different casing. In the case of such a configuration, the evaluator 31 acquires an elastic wave source distribution from a different casing and evaluates the soundness of a structure using the acquired elastic wave source distribution. Further, the evaluator 31 outputs the evaluation result to the display 32 included in the different casing.

Due to such a configuration, the manufacturing cost of the structure evaluation apparatus 30 can be reduced by using an existing device for deriving an elastic wave source distribution.

The signal processor 20 may be configured to perform signal processing for an AE source signal, of the input AE source signals, including an amplitude value larger than a first threshold which is set to be higher than a noise level. Specifically, first, when vibration larger than the first threshold is detected, the signal processor 20 determines a signal corresponding to a predetermined time from a time exceeding the first threshold as the waveform of an elastic wave and saves the AE source signal having an amplitude value larger than the first threshold. Further, the signal processor 20 extracts AE feature amounts including information related to an elastic wave on the basis of data of the waveform of the elastic wave indicated by the saved AE source signal. The first threshold is set in advance.

The signal processors 20 and 20b may be included in the structure evaluation apparatuses 30 and 30d. In the case of such a configuration, the signal processors 20 and 20b directly acquire an AE source signal subjected to processing by the sensor 10 from the sensor 10 or via a relay device (not shown in the diagram).

In FIGS. 1, 15, and 16, one signal processor 20 is connected to the plurality of sensors 10-1 to 10-n. However, the structure evaluation systems 100, 100d, and 100e may be configured to include a plurality of signal processors 20 and include a plurality of sensor units such that the signal processors 20 are respectively connected to the sensor 10.

When an error map is newly generated, the error map generator 315 may be configured to update the error map using the error map of the same evaluation area which has been generated until the preceding stage and the error map which has been newly generated. In addition, regarding the velocity field map as well, similar to the error map, the velocity field map generator 316 updates the velocity field map using a newly generated velocity field map and the velocity field map of the preceding stage. In the case of such a configuration, for example, the velocity field map generator 316 calculates the average value of the elastic wave propagation velocities v in the divided areas of the velocity field maps which have been generated until that time including the newly generated velocity field map for each of the divided sections and updates the velocity field map by allocating the calculated values to the respective divided sections as updated values.

According to at least one embodiment described above, the accuracy of evaluating the deterioration state of a structure can be improved by including a plurality of sensors 10 that detect elastic waves, the arrival time determiner 203 that determines the arrival times of elastic waves using elastic waves detected by the plurality of respective sensors 10, the reliability calculator 204 that calculates reliabilities related to measurement waveforms of the elastic waves on the basis of the arrival times, and the error map generator 315 that generates an error map related to the arrival times of elastic waves on the basis of the calculated reliabilities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
a plurality of sensors configured to detect elastic waves;
an arrival time determiner configured to determine a first elastic wave arrival time and a second elastic wave arrival time of the elastic waves for each of the elastic waves detected by the plurality of respective sensors;
a reliability calculator configured to calculate reliabilities related to measurement waveforms of the elastic waves on the basis of the first elastic wave arrival time and the second elastic wave arrival time; and
a map generator configured to generate a first map on the basis of the calculated reliabilities or the reliabilities and a distance.

2. The structure evaluation system according to claim 1, wherein the reliability calculator calculates an integrated value of a value related to a reciprocal of a time difference between the first elastic wave arrival time and the second elastic wave arrival time as the reliability.

3. The structure evaluation system according to claim 1, wherein the map generator generates the first map by dividing an evaluation area for soundness of a structure into a plurality of sections and allocating values corresponding to the reliabilities to the divided sections.

4. The structure evaluation system according to claim 1 further comprising:
a position-velocity locator configured to locate positions of generation sources of elastic waves or the positions of the generation sources of elastic waves and velocities of the elastic waves on the basis of the arrival times of a plurality of elastic waves detected by the plurality of respective sensors,
wherein the map generator further generates a second map related to the velocities of the elastic waves on the basis of the positions of the generation sources of the elastic waves and the velocities of the elastic waves.

5. The structure evaluation system according to claim 1 further comprising:
a corrector configured to correct the first elastic wave arrival time of the elastic waves on the basis of the elastic waves.

6. The structure evaluation system according to claim 5, wherein the corrector identifies a sensor having a possibility of occurrence of abnormality and corrects the first elastic wave arrival time of the elastic waves detected by the sensor having a possibility of occurrence of abnormality on the basis of a plurality of elastic waves obtained by one of plurality of sensors.

7. The structure evaluation system according to claim 1 further comprising:
a measurement result evaluator configured to perform evaluation for an area in which damage has occurred within an evaluation area or a possibility of occurrence of abnormality in the sensor on the basis of the reliabilities.

8. The structure evaluation system according to claim 1 further comprising:
a selector configured to select an elastic wave to be utilized in evaluation in accordance with amplitudes of the elastic waves,
wherein the arrival time determiner determines the first elastic wave arrival time and the second elastic wave arrival time using the selected elastic wave.

9. A structure evaluation apparatus comprising:
a map generator configured to generate a first map on the basis of reliabilities related to measurement waveforms of elastic waves calculated on the basis of a first elastic wave arrival time and a second elastic wave arrival time of the elastic waves determined for each of the elastic waves detected by a plurality of respective sensors detecting elastic waves or the reliabilities and a distance.

10. A structure evaluation method comprising:
determining a first elastic wave arrival time and a second elastic wave arrival time of elastic waves for each of the elastic waves detected by a plurality of respective sensors detecting elastic waves;
calculating reliabilities related to measurement waveforms of the elastic waves on the basis of the first elastic wave arrival time and the second elastic wave arrival time; and
generating a first map on the basis of the calculated reliabilities or the reliabilities and a distance.

* * * * *